(12) United States Patent
Nargizian

(10) Patent No.: US 8,719,136 B2
(45) Date of Patent: May 6, 2014

(54) SYSTEMS AND METHODS RELATING TO CREDIT

(71) Applicant: Steven Nargizian, Franklin Lakes, NJ (US)

(72) Inventor: Steven Nargizian, Franklin Lakes, NJ (US)

(*) Notice: Subject to any disclaimer, the term of this patent is extended or adjusted under 35 U.S.C. 154(b) by 0 days.

(21) Appl. No.: 14/072,435

(22) Filed: Nov. 5, 2013

(65) Prior Publication Data

US 2014/0067653 A1 Mar. 6, 2014

Related U.S. Application Data

(63) Continuation of application No. 13/399,835, filed on Feb. 17, 2012, now Pat. No. 8,577,768.

(60) Provisional application No. 61/443,945, filed on Feb. 17, 2011, provisional application No. 61/513,482, filed on Jul. 29, 2011.

(51) Int. Cl.
*G06Q 40/00* (2012.01)

(52) U.S. Cl.
USPC .......................................... 705/35; 705/36 R

(58) Field of Classification Search
USPC ...................................................... 705/35–40
See application file for complete search history.

(56) References Cited

U.S. PATENT DOCUMENTS 8,244,611 B2* 8/2012 Galit ................................ 705/35
2008/0172301 A1* 7/2008 Bice ................................ 705/26

* cited by examiner

*Primary Examiner* — Thu Thao Havan
(74) *Attorney, Agent, or Firm* — McCarter & English, LLP

(57) ABSTRACT

The present invention includes an electronic platform where business credit can be created, affiliated, transmitted, redeemed and processed, etc. in connection with multiple redeemers. The present invention includes an electronic platform where business credit can be purchased, sold and/or gifted in connection with multiple redeemers. The present invention also includes an electronic platform where business credit can be accounted for, monitored, and organized, etc. Furthermore, the present invention provides the ability to redeem business credit (including store credit) in connection with multiple redemptions through multiple redeemers, via a single redemption apparatus (e.g., a smart card).

10 Claims, 28 Drawing Sheets

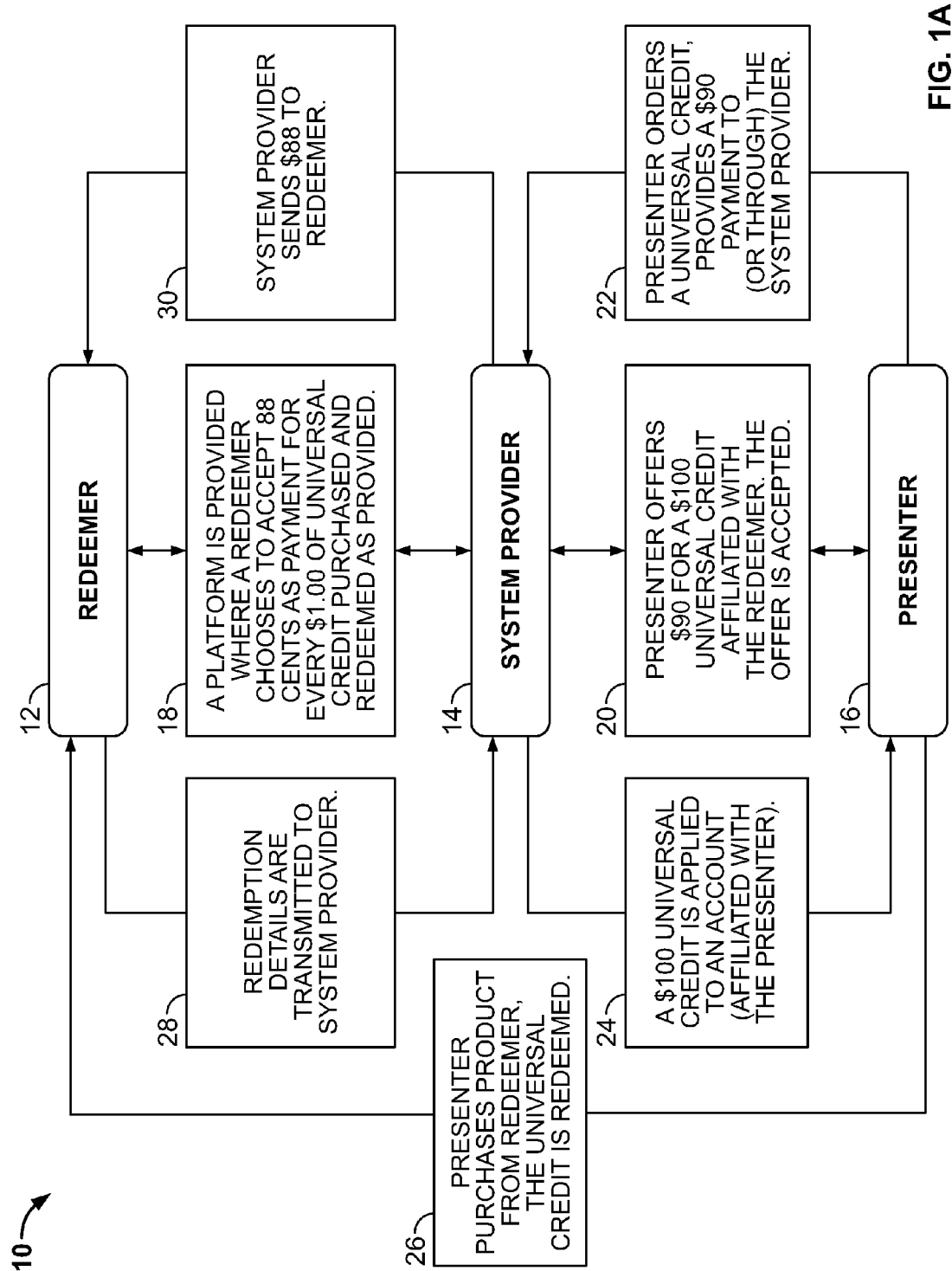

ESTABLISH TERMS

VIEW ALL VENDORS | ADD A NEW VENDOR | SELECT A VENDOR | SOLICIT VENDOR CONTRIBUTION | CREATE A TARGET GROUP

| | | | |
|---|---|---|---|
| ADD NEW LISTING | VENDOR # | | TOKEN CREDIT | $ (PAYMENT FOR REDEMPTION) |
| EDIT LISTING | VENDOR | | TARGETED CREDIT | $ PER $1.00 (GROUP #0131) |
| DELETE LISTING | UPC# | | UNIVERSAL CREDIT | $.88 PER $1.00 (PAYMENT / REDEMPTION RATE) |
| VIEW ALL PRODUCTS | PRODUCT | | VENDOR CONTRIBUTION | $ |
| | LIST PRICE | $ | | |

[CLEAR] [SUBMIT]

APRIL 03, 2013 12:42.18 EST    HOME

MICHAEL BEN-DAVID OF HOME DEPOT IS LOGGED IN SECURITY ACCESS GRANTED    HOME DEPOT

FIG. 1B

GOT GRAVY?

JEWELRY | FASHION | ELECTRONICS | HOME | FOOD | TRAVEL | AUTO | SPORTS | SERVICES | HEALTH & WELLNESS

CUSTOMIZE AN OFFER | POSTED OFFERS | GRAVY BOAT | LOCATE A UPC | SECONDARY MARKET | MY ACCOUNT | LOGOUT

YOU ARE LOGGED IN AS JOHN SMITH
DECEMBER 31, 2013
NEW TO GRAVY? LEARN MORE

SEARCH [GO]

CUSTOMIZE AN OFFER: UNIVERSAL CREDIT   JOHN SMITH

PLEASE FILL OUT THE INFORMATION BELOW.

ⓘ MERCHANT #: 17-64359
MERCHANT: HOME DEPOT ☑
REDEMPTION VALUE: $100
OFFER AMOUNT: $90 ☑
EXPIRATION: 12/30/2018
QUANTITY: 1

○ THIS IS A GIFT  ⊗ CREDIT MY ACCOUNT

[REVISE]  [SUBMIT OFFER]

$100 UNIVERSAL CREDIT    ORDER REFERENCE ID #: 637674
EXPIRATION 12/30/2018

YOUR OFFER HAS BEEN ACCEPTED.

NATIONWIDE

| MERCHANT | AVAILABLE BALANCE | EXPIRATION DATE | PURCHASED BY |
|---|---|---|---|
| BLOOMINGDALES | $3.17 | 02/13/2017 | KAREN TRILLIO |
| AMERICAN AIRLINES | $47.50 | 04/12/2017 | ME |
| HOME DEPOT | $100 | 12/30/2018 | ME |
| LODI HARLEY DAVIDSON | $10,000 | 12/17/2020 | ME |
| STARBUCKS | $12.34 | 01/20/2021 | YOUR WIFE! |
| | $10,163.01 (GRAND TOTAL) | | |

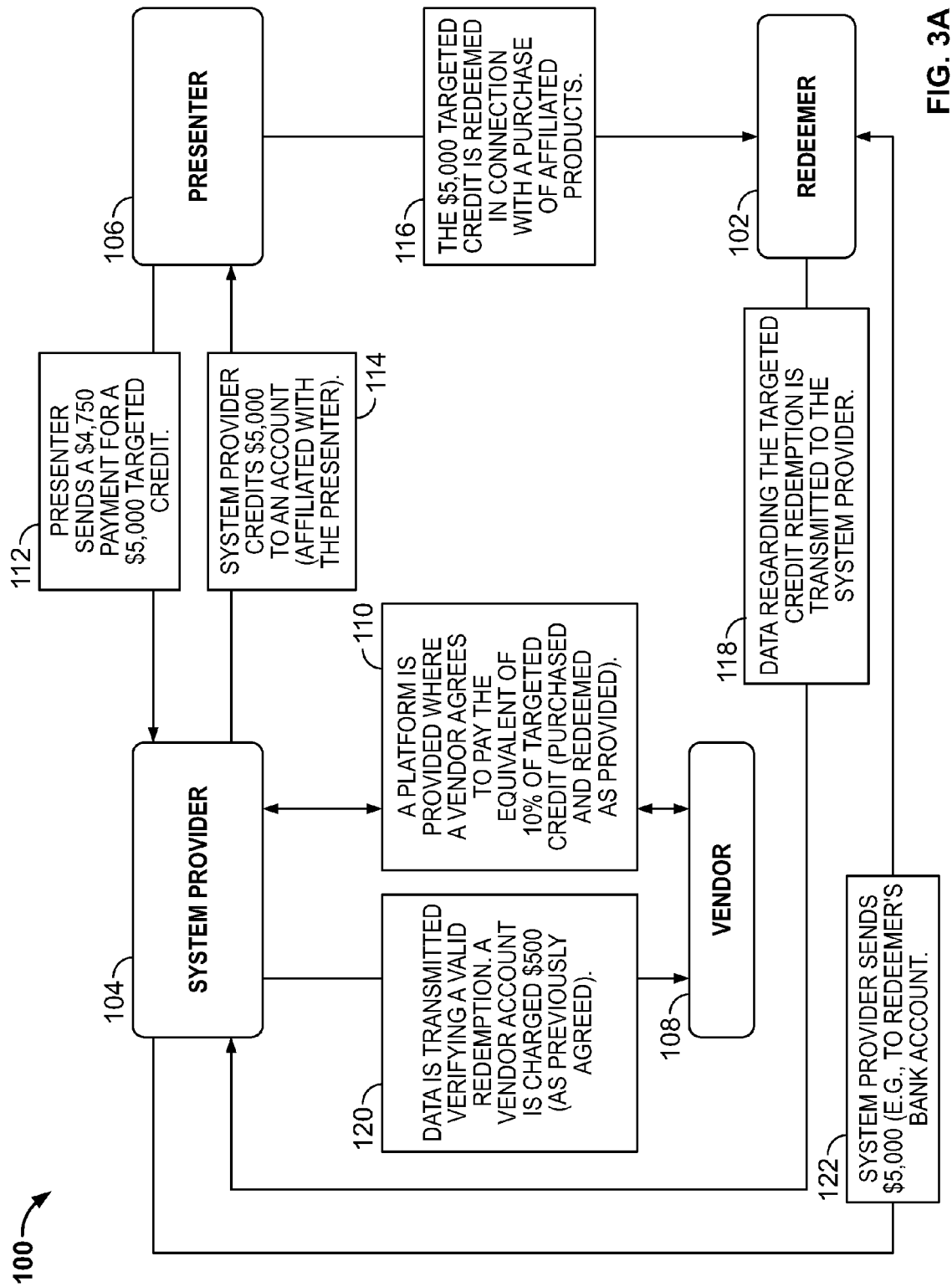

GRAVY  
GOT GRAVY?  
CUSTOMIZE AN OFFER | POSTED OFFERS | GRAVY BOAT | LOCATE A UPC | SECONDARY MARKET | MY ACCOUNT | LOGOUT

YOU ARE LOGGED IN AS JOHN SMITH  
DECEMBER 31, 2013

NEW TO GRAVY?   LEARN MORE   SEARCH  GO

JEWELRY  FASHION  ELECTRONICS  HOME  FOOD  TRAVEL  AUTO  SPORTS  SERVICES  HEALTH & WELLNESS

UNIVERSAL CREDIT | TARGETED CREDIT | TOKEN CREDIT | OPTIONS

AVAILABLE TARGETED CREDIT
JOHN SMITH

| MERCHANT | TARGET GROUP | PROVIDER | AVAILABLE BALANCE | EXPIRATION DATE | PURCHASED BY |
|---|---|---|---|---|---|
| MACY'S | SEALY BRAND | SEALY | $300 | 02/13/2018 | ME |
| TARGET | DYSON BRAND | TARGET | $400 | 05/01/2018 | ME |
| WILLIAMS SONOMA | (M-1663) | GRAVY | $200 | 12/31/2019 | KAREN TRINILLO |
| HARTGER'S JEWELERS | ROLEX BRAND | ROLEX | $5,000 | 10/11/2020 | ME |
| SHOPRITE | BOARS HEAD BRAND | GRAVY | $12 | 01/05/2021 | ME |
| | | | $5,911 (GRAND TOTAL) | | |

NOVEMBER 02, 2013  2:54.05 EST   HOME

THERESA DAVIS OF MICROSOFT IS LOGGED IN.

SECURITY ACCESS GRANTED MICROSOFT

ESTABLISH MARKETING CONTRIBUTION

VIEW ALL MERCHANTS  ADD A NEW MERCHANT  SELECT A MERCHANT  VIEW ALL MERCHANTS  VIEW SUPPLIER CONTRIBUTION  ADD NEW SUPPLIER  CREATE A TARGET GROUP

| | | | |
|---|---|---|---|
| ADD NEW LISTING | UPC# | 385948763298 | LP/TCR | $200 / $160 |
| EDIT LISTING | PRODUCT | XBOX 360 | ☑ MICROSOFT | $20   (MARKETING CONTRIBUTION) |
| DELETE LISTING | MERCHANT ID # | 00-843295 | ☑ TARGETED CREDIT | $ .95 PER $1.00   (MICROSOFT BRAND) ▼ |
| VIEW ALL PRODUCTS | MERCHANT | WALMART | ☑ | REDEMPTION RATE |

CLEAR    SUBMIT

GOT GRAVY?

CUSTOMIZE AN OFFER | POSTED OFFERS | GRAVY BOAT | LOCATE A UPC | SECONDARY MARKET | MY ACCOUNT  LOGOUT

YOU ARE LOGGED IN AS JOHN SMITH
DECEMBER 31, 2013

NEW TO GRAVY? LEARN MORE

SEARCH [GO]

JEWELRY  FASHION  ELECTRONICS  HOME  FOOD  TRAVEL  AUTO  SPORTS  SERVICES  HEALTH & WELLNESS

JOHN SMITH

UNIVERSAL CREDIT   TARGETED CREDIT   TOKEN CREDIT   OPTIONS

UNREDEEMED TOKEN CREDIT

| MERCHANT | AFFILIATED PRODUCT | PROVIDER | EXPIRATION DATE | PURCHASED BY |
|---|---|---|---|---|
| LL BEAN | BEAN'S ACADIA CRUISER® BIKE | GRAVY | 05/30/2014 | DIANE ZORAIAN |
| AMAZON | KINDLE DX WIRELESS READING DEVICE | AMAZON | 03/21/2015 | ME |
| WALMART | XBOX 360 | GRAVY | 12/30/2018 | ME |

FIG. 4F

GOT GRAVY?

CUSTOMIZE AN OFFER | POSTED OFFERS | GRAVY BOAT | LOCATE A UPC | SECONDARY MARKET | MY ACCOUNT  LOGOUT

YOU ARE LOGGED IN AS JOHN SMITH
DECEMBER 31, 2013

NEW TO GRAVY?   LEARN MORE   SEARCH [GO]

JEWELRY  FASHION  ELECTRONICS  HOME  FOOD  TRAVEL  AUTO  SPORTS  SERVICES  HEALTH & WELLNESS

UNIVERSAL CREDIT | TARGETED CREDIT | TOKEN CREDIT | OPTIONS

UNEXERCISED OPTIONS
JOHN SMITH

| MERCHANT | PRODUCT | OPTION TYPE | PURCHASED BY | OPTION DETAILS | OPTION EXPIRATION | PURCHASED BY |
|---|---|---|---|---|---|---|
| PRESTIGE MOTORS | 500 SERIES | TARGETED | GIFT | DETAILS | | LISA SMITH |
| LOWES | X-300 TRACTOR | TOKEN CRED T | $250 | DETAILS | | ME |
| MIDTOWN ORAL SURGERY | UNIVERSAL | UNIVERSAL | $100 | DETAILS | EXP. 12/30/2014 | ME |

$350 (MY TOTAL)

EXERCISE PAYMENT: $800
EXERCISABLE FOR: $1,000 UNIVERSAL
FACILITATOR: DR. WOO DDS

FIG. 5C

GRAVY
GOT GRAVY?

CUSTOMIZE AN OFFER | POSTED OFFERS | GRAVY BOAT | LOCATE A UPC | SECONDARY MARKET | MY ACCOUNT  LOGOUT

YOU ARE LOGGED IN AS JOHN SMITH
DECEMBER 31, 2013

NEW TO GRAVY?   LEARN MORE   SEARCH [GO]

JEWELRY  FASHION  ELECTRONICS  HOME  FOOD  TRAVEL  AUTO  SPORTS  SERVICES  HEALTH & WELLNESS

ACCOUNT SUMMARY

JOHN SMITH

UNIVERSAL CREDIT | TARGETED CREDIT | TOKEN CREDIT | OPTIONS

| MERCHANT | TOTAL COST | ISSUED AMOUNT | TYPE | ACCOUNT STATUS | DATE PURCHASED | PAYMENT METHOD |
|---|---|---|---|---|---|---|
| TICKETMASTER | $450 | $500 | TARGETED | CLOSED | 04/03/2013 | ACH PAYMENT # 11141 |
| HOME DEPOT | $90 | $100 | UNIVERSAL | OPEN | 12/31/2013 | XXXX-XXXX-XXXX-9642 (MC) |
| HARTGER'S JEWELERS | $4,750 | $5,000 | TARGETED | OPEN | 10/12/2015 | CHECK # 4137 |
| LODI HARLEY DAVIDSON | $9,500 | $10,000 | UNIVERSAL | OPEN | 12/17/2015 | GRAVY DEBIT # 39311 |
| MIDTOWN ORAL SURGERY | $900 (COMBINED) | $1,000 | OPTION | CLOSED | 01/20/2016 | XXXX-XXXX-XXXX-1396 (AMEX) |
| STARBUCKS | GIFT | $100 | UNIVERSAL | OPEN | 01/21/2016 | GIFT |
| NORDSTROM | $60 | N/A | OPTION | UNEXERCISED | 04/05/2016 | GRAVY DEBIT # 41422 |
|  | $15,750 (MY TOTAL) | $16,700 (GRAND TOTAL) |  |  |  |  |

YOUR TOTAL GRAVY SAVINGS: $950!

FIG. 5D

SYSTEMS AND METHODS RELATING TO CREDIT

CROSS-REFERENCE TO RELATED APPLICATIONS

This application is a continuation application of and claims the benefit of priority to U.S. patent application Ser. No. 13/399,835 having a filing date of Feb. 17, 2012, now U.S. Pat. No. 8,577,767, which claims the benefit of priority to U.S. Provisional Patent Application No. 61/443,945, filed Feb. 17, 2011, and U.S. Provisional Patent Application No. 61/513,482, filed Jul. 29, 2011, the entire disclosures of which are expressly incorporated herein by reference.

BACKGROUND OF THE INVENTION

1. Field of the Invention

The present invention relates generally to the field of commerce. More specifically, the present invention comprises systems and methods relating to credit.

2. Related Art

Credit has been provided by businesses for generations. For example, merchants provided store credit using a paper voucher; these were given to customers who returned product, in lieu of a cash refund. Gift certificates were brought to the mass market by big department stores in the mid-1930s. The gift card is a descendant of the paper gift certificate, and gained popularity in the 1990's. Traditionally, such credit is paid for on a dollar for dollar basis upon its initial issuance (its purchase price equals the monetary amount connected with its full redemption).

REFERENCE GUIDE

The following terms as used herein and with respect to embodiments of the present invention include (but may not be limited to) the following descriptions:

Redeemers: The term "redeemers" refers to persons or entities that accept credit as a method of payment.

Purchasers: The term "purchasers" refers to persons or entities that pay or promise to pay for credit and/or credit services.

Presenters: The term "presenters" refers to persons or entities that present credit (to redeemers) in connection with making a payment.

Terms: The word "terms" as used herein, may also encompass "conditions".

Goods and/or Services (Products): The terms "goods and/or services" and "products" have the same meaning and are used interchangeably herein.

and/or: The term "and/or" as used herein, and with respect to embodiments of the present invention, is used to indicate that one or more of the stated cases may occur. For example, the sentence "He will have cake, pie, and/or brownies" indicates that although the person may have any of the three listed desserts, the choices are not exclusive; the person may have one, two, or all three of the choices.

SUMMARY OF THE INVENTION

The present invention encompasses systems and methods of payment utilizing credit. The present invention includes systems and methods of creating credit with specific features; such credit can be defined and categorized based upon these features. The term "business credit" is used in a general sense within this document to encompass universal credit, targeted credit, and token credit. The term "store credit" as used herein, refers to credit that is affiliated with a single redeemer for use in connection with all of the redeemer's products (e.g., a traditional gift card provided by a retail store). The present invention encompasses systems and methods pertaining to business credit (as referenced above). Provided herein are additional types of credit and systems and methods associated with the creation and utilization of such. The first, universal credit, refers to credit that is affiliated with one or more particular redeemers (e.g., specifically identified utilizing the redeemer's EIN) within a credit system, enabling universal credit to be affiliated or, redeemed in connection with these particular redeemers, while excluding other redeemers (within the same credit system) from being able to redeem the same. Universal credit encompasses all the benefits and characteristics of store credit as well as additional benefits and characteristics (e.g., universal credit can be affiliated with more than one redeemer, or affiliated with a particular presenter). An additional credit type, targeted credit, refers to credit that is exclusively redeemable in connection with purchases of particular (e.g., specifically identified by UPC) products. Lastly, token credit refers to credit that is redeemable as full payment in exclusive connection with the purchase of a particular product (e.g., specifically identified by UPC), regardless of the price of the product.

The present invention includes an electronic platform where business credit can be created, affiliated, transmitted, redeemed and processed, etc. in connection with multiple redeemers. The present invention includes an electronic platform where business credit can be purchased, sold and/or gifted in connection with multiple redeemers. The present invention also includes an electronic platform where business credit can be accounted for, monitored, and organized, etc. Furthermore, the present invention provides the ability to redeem business credit (including store credit) in connection with multiple redemptions through multiple redeemers, via a single redemption apparatus (e.g., a smart card).

The present invention includes systems and/or methods where business credit can be created, affiliated, transmitted, redeemed and/or processed, etc., in connection with particular redeemers (e.g., specifically identified via their Employer Identification Number) within a credit system incorporating multiple redeemers. The present invention includes systems and methods where products (e.g., sharing the same UPC) can be segregated and grouped and credit can be created, affiliated, transmitted, redeemed and/or processed, etc., exclusively in connection with one or more of the aforementioned products. The present invention also includes systems and methods where a particular good or service can be segregated (e.g., utilizing its UPC) and credit can be created, affiliated, transmitted, redeemed and/or processed exclusively in connection with the particular good or service, regardless of asking price, providing a purchaser with the ability to purchase such credit without need for concern with regard to the price. The present invention also incorporates systems and methods where business credit can be purchased in connection with two separate payments, providing benefits to various parties. The present invention provides systems and methods where business credit can be affiliated with authorized presenters, providing security to the same.

The present invention incorporates use of a computer system (operated by a system provider) that includes at least one processing server. Parties (e.g., a purchaser, a redeemer and/or a system provider) utilizing the present invention could communicate with one another using their computer systems and communication links, via a network (e.g., the Internet).

The present invention includes systems and methods where existing or proposed business credit can be bought and sold via an electronic exchange or marketplace. The present invention provides a platform (e.g., a website and associated hardware and software, etc.) where purchasers can customize or specify multiple terms associated with business credit and offers therefor (e.g., the price to be paid for business credit, the monetary value associated with its full redemption, its affiliated redeemers, etc.).

The systems described herein, include a platform where terms associated with payments to redeemers for credit redemptions, can be specified by redeemers. For example, a platform can be provided where a redeemer can determine the monetary amount it will be paid for a credit redemption verses the monetary amount it redeems ("the payment/redemption rate"). The present invention provides systems and methods where parties (e.g., redeemers) can promote all their products, a group of particular products, specific products and/or raise cash, via the utilization of business credit.

Using systems and methods described herein, terms associated with business credit and offers therefor, can be customized by a purchaser where the monetary cost (or purchase price) of business credit is less than or equal to its redemption value. For example, a purchaser could offer to pay $170 for a proposed universal credit that provides a $200 redemption value. The present invention also entails systems and methods where multiple parties (e.g., a vendor and a redeemer) can jointly promote the selling of business credit, as well as any products associated with such.

BRIEF DESCRIPTION OF THE DRAWINGS

The foregoing features of the invention will be apparent from the following Detailed Description of the Invention, taken in connection with the accompanying FIGS. in which:

FIG. 1A is a diagram showing an example of an embodiment of the system, wherein business credit is purchased through (or from) a system provider;

FIG. 1B is a sample web-page provided by a system provider (e.g., a fictitious company named "Gravy"), illustrating how a redeemer (e.g., a national hardware chain) could specify a payment/redemption rate;

FIGS. 1C, 1D, 1E, and 1F illustrate sample web-pages which could be used to purchase business credit;

FIG. 3A is diagram showing an example of another embodiment of the system, wherein targeted credit is utilized in connection with a purchase of a particular product brand;

FIG. 3C is a sample web-page illustrating another type of business credit account (targeted);

FIG. 4B is a sample web-page where terms associated with payments for redemptions of business credit can be specified by a redeemer;

FIG. 4C is a sample web-page illustrating how a vendor could provide incentive to a purchaser of business credit;

FIG. 4D is a sample web-page illustrating how a parts supplier could contribute to a promotion regarding the sale of business credit;

FIG. 4F is a sample web-page illustrating another type of business credit account (token);

FIG. 5C is a sample web-page depicting an options account;

FIG. 5D is a sample web-page depicting an account history;

DETAILED DESCRIPTION OF THE INVENTION

Figure 6:
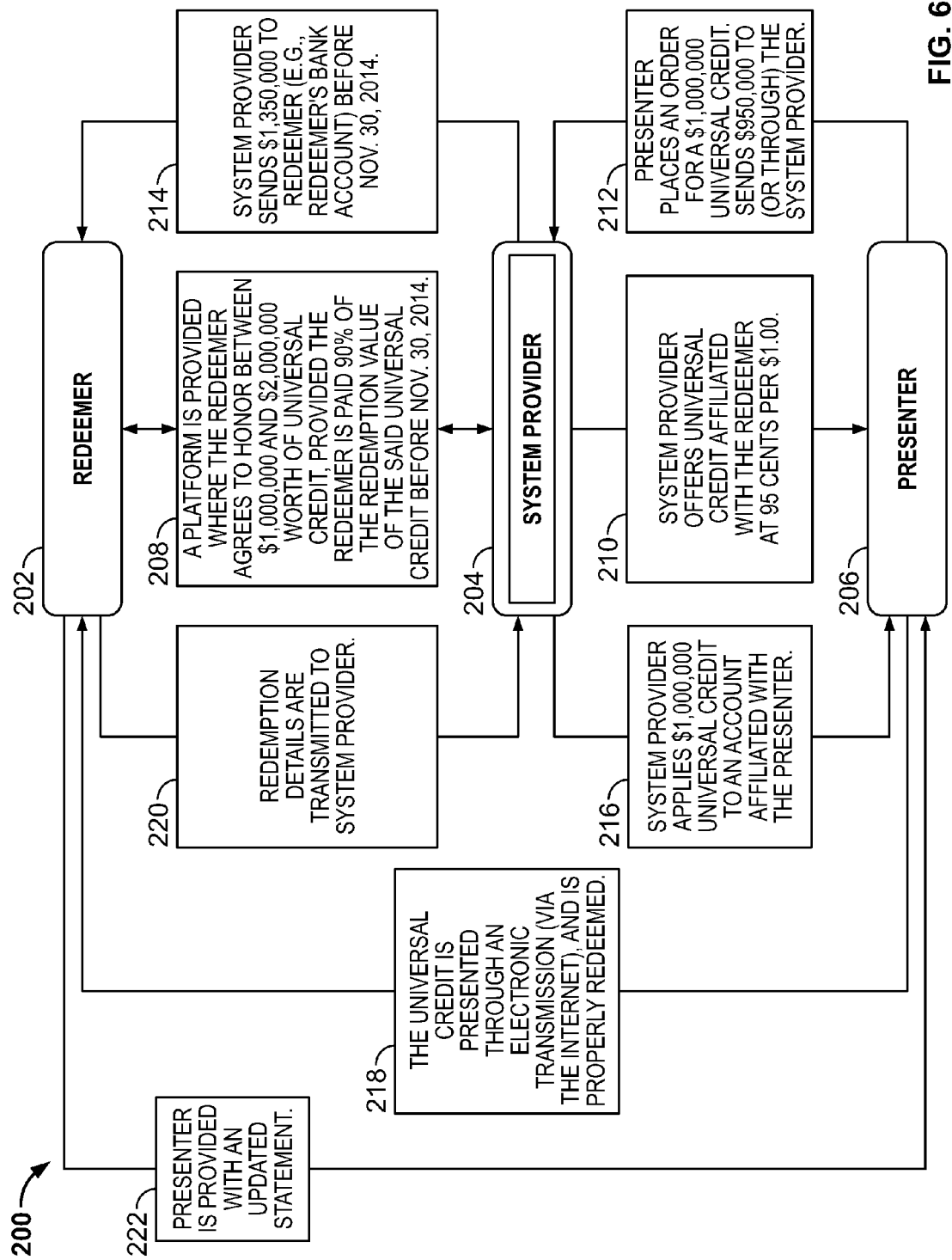
FIG. 6 is a diagram showing an example of another embodiment of the system wherein business credit is provided in connection with fixed monthly expenses and/or commitments.

The present invention encompasses systems and methods of payment utilizing credit. The term "business credit" is used in a general sense within this document to encompass universal credit, targeted credit, and token credit. The term "store credit" as used herein, refers to credit that is affiliated with a single redeemer and in connection with all of the redeemer's products. The present invention includes systems and methods of creating credit with specific features; such credit can be defined and categorized based upon these features. The present invention encompasses systems and methods associated with business credit (as referenced above). Provided herein are additional types of credit and systems and methods associated with the creation and utilization of such. As previously mentioned, universal credit refers to credit that is affiliated or redeemable, with one or more particular redeemers (e.g., specifically identified via the utilization of EINs), within a credit system, while excluding other redeemers within the same credit system (e.g., from being able to redeem the same). Like store credit, universal credit is redeemable in connection with any good and/or service offered for sale by an affiliated redeemer. However, universal credit can be utilized in ways that store credit cannot (e.g., universal credit can be affiliated with more than one redeemer, or affiliated with an authorized presenter), thus, universal credit encompasses store credit. Universal credit can also be redeemed in connection with monies owed for off balance sheet financing (e.g., rent, etc.), as depicted in FIG. 6. Additionally, targeted credit, refers to credit that is exclusively redeemable in connection with purchases of particular products (e.g., specifically identified via UPC). Lastly, token credit refers to credit that is exclusively redeemable (as full payment) in connection with a purchase of a particular product (e.g., specifically identified via UPC), regardless of the asking price (of the product). Universal credit and targeted credit can be redeemed piecemeal, where for example, the monetary amount paid to a redeemer (for a redemption), can be provided in the same proportion of the previously accepted and/or approved payment/redemption ratio.

As previously mentioned, business credit is affiliated with particular redeemers (e.g., specifically identified) within a credit system (e.g., a credit system incorporating multiple redeemers). Such redeemers can be identified by name, MN, other numbers and/or identifying codes, or other known usable means of identification (e.g., a particular vendor's authorized dealers who use the system). The present invention includes systems and methods where business credit is affiliated with authorized presenters and identification could be required when presenting the same for redemption (providing protection against theft and/or fraud). Additionally, the present invention provides means where parties can electronically transfer (e.g., sell or gift) business credit to another party. Business credit can be provided by various parties via the present invention, for example, a system provider can sell business credit directly to a purchaser, or provide systems that enable other parties such as a vendor or a redeemer to sell such credit. The term business credit as used herein can refer to (perhaps depending upon the context of the usage) proposed (or potential) business credit, as well as existing business credit in which terms have been established. Furthermore, business credit can be affiliated with a redeemer where the redeemer pays for the affiliation, doesn't pay for the affiliation, or may even be paid for the affiliation. Additionally, a system provider may approve payment/redemption rates where the payment is less than the redemption, equal to the redemption, or ever more than the redemption.

The systems and/or methods described herein could be implemented business to business and/or business to consumer. Furthermore, such system and/or methods can be provided by one or more "system providers". References to parties (e.g., a facilitator) herein, can include reference to the party's computer system.

The present invention incorporates use of a computer system (operated by a system provider) that includes at least one processing server. Parties utilizing the present invention could communicate with one another using their computer systems and communication links, via a network (e.g., the Internet). The present invention can be provided (via a website) where offers to buy and/or sell business credit could be communicated.

The word "terms" as used herein and with respect to embodiments of the present invention, can refer to the terms associated with a deal or an offer. For example, a term could be the price a purchaser offers to pay for business credit. The word "terms" can also be used in connection with redemptions. ("redemption terms"). For example, a term could be the monetary amount to be paid (to a redeemer) for a redemption. The word "terms" can also refer to the terms associated with the business credit itself (i.e., the terms related to the use of the business credit).

The present invention includes systems and methods where business credit (including store credit) can be affiliated with redeemers, who did not necessarily create, establish terms for, and/or issue the same. The present invention provides systems and methods where redeemers are paid in connection with business credit (including store credit), prior to, upon and/or after the redemption of the same.

The present invention can provide savings to presenters, as well as savings over and above other savings. For example, a "20% off" discount offered (outside the system) may not be combinable with other offers, however, business credit can be purchased for a monetary amount that is less than its redemption value, thus the redemption of such can provide additional savings. In essence, a presenter could save money utilizing the discount, as well as save money in connection with the purchase and redemption of the business credit.

The present invention can be viewed or implemented in different ways. For example, a system provider could view the present invention as a system that provides the market value (or market price) of business credit (where such credit is traded for money), as accepted by parties. Alternatively, the present invention could be viewed or implemented as systems or methods that can provide business credit at a lower monetary amount than the amount associated with its full redemption. Additionally, the present invention could be viewed or implemented as systems or methods that provide business credit on a dollar for dollar basis (where its price is equal to the monetary value connected with its redemption) and where additional or bonus business credit can be provided at a reduced rate or no additional cost. Laws, agreements and/or contracts could dictate the implementation of the present invention.

The present invention provides systems and methods where redeemers can determine the monetary amount they will be paid for credit redemptions. For example, a redeemer could specify a payment/redemption rate (the monetary amount paid [to a redeemer] for a redemption; in relation to [or verses] the monetary value being redeemed). The present invention also provides systems and methods where purchasers of business credit can specify and submit both; the full redemption value (of the business credit), as well as a price the purchaser is willing to pay for it. As is commonly done, contracts and/or formal agreements could be used to ensure the functionality of the present invention and that a participating party's obligations are adhered to. For example, contracts and/or formal agreements could obligate a redeemer to honor business credit (e.g., provided by a vendor) as if it was created and/or issued by the redeemer without use of the system. In fact, system providers could require redeemers to honor such credit upon valid presentation, without exception.

A person or entity could use the systems and methods as various parties. For example, a bakery could use the systems and methods as a redeemer, in connection with a purchase of bread directly from the bakery. The same bakery could also use the system (as a vendor), where targeted credit (targeted to the bakery's brand of bread) is utilized in connection with purchases of the bakery's brand from a supermarket (the redeemer). Alternatively, the same bakery could use the system as a presenter, to purchase flower from a mill (the redeemer). Thus, the same person or entity could be one type of party in one transaction, and another type of party in another transaction. Parties herein referenced by name (e.g., presenter, redeemer, etc.), are referenced as per their role within a particular transaction.

In the examples of the embodiments of the systems and methods depicted and described herein, there are numerous options and/or features that are described in one embodiment which could also be provided in connection with other embodiments, as would be understood by one having ordinary skill in the art. Furthermore, more than one method step, process, and/or transmission may be combined into one block (of a diagram). Moreover, while many of the figures show method steps, processes, and/or transmissions which are numbered in order, it should be pointed out that the order in which they are performed may not be the only order in which they can be effectively provided. Also of note, the examples described throughout the figures and specification were written with knowledge of the outcome, before the outcome is described, thus, for example, a purchaser of token credit may be identified and described as "a presenter" at the time of the purchase. It is anticipated that a large percentage of business credit purchased via the present invention, will not be presented for redemption by its purchaser.

Examples of embodiments of the present invention are discussed in detail below in connection with FIGS. 1-6. For illustrative purposes, such examples may include numerical and/or monetary amounts; this is not intended to limit the spirit or scope of the invention. Furthermore, in all of the embodiments described herein, there are numerous variations and/or modifications that can be made without departing from the spirit and scope of the invention, and are intended to be included, as would be understood by one skilled in the art. Moreover, multiple variations can be made regarding what different parties do, may be obligated to do, and/or are authorized to do, without departing from the spirit and scope of the present invention.

The system providers depicted and described in connection with FIGS. 1-6 may also provide banking services, and accounts held with the said system providers may be charged and/or debited by the system provider, as is commonly done by banks. However, it is not required or necessary that a system provider be a bank. As will be discussed, a system provider could comprise a processing server, web server, software, and hardware, etc. for facilitating the systems and methods provided herein (e.g., as described in connection with FIGS. 7 and 8).

FIG. 1A is a diagram showing an example of one embodiment of the present invention, indicated generally at 10. As commonly provided, in order to use the system described herein, parties may be required to enter formal agreements (regarding use and obligations of the system, etc.). As depicted in block 18, a platform is provided where payments (e.g., for redemptions) to a redeemer 12, can be specified by the redeemer 12. As per this example the redeemer 12 authorizes the system provider 14 and agrees to accept 88 cents for every dollar it redeems in association with the affiliated credit. Of note, payments to redeemers do not necessarily have to be in connection with the redemption of credit, for example, a payment can be made to a redeemer in connection with the issuance of a business credit. FIG. 1B is a sample web-page that further illustrates this platform, here a redeemer (a multi-national hardware chain) can specify a desired payment/redemption ratio in connection with redemptions of universal credit. Such specification can remain valid for a specified period, or, be terminated or modified at the redeemer's discretion.

Furthermore, the present invention could provide a platform that enables system providers to specify acceptable circumstances and/or parameters, which could be processed in conjunction with data provided by other parties (e.g., redeemers or purchasers) to determine whether or not offers are approved. Such circumstances and/or parameters could include acceptable margins or spreads, whether or not incentives are offered, etc. Interestingly, a system provider might approve a transaction where the purchase price for business credit is less than the monetary amount to be paid to an affiliated redeemer in connection with a full redemption of the affiliated business credit. In such instances, the system provider may hope to profit by retaining unredeemed and expired business credit, or by other means.

Figure 1C:

As indicated by block 20, a platform can be provided where multiple terms associated with universal credit can be specified, and where offers for the same can be submitted by a purchaser (e.g., presenter 16). Terms can include; which redeemers are affiliated with the universal credit, the redemption value associated with the same (e.g., $100), as well as the price the purchaser (e.g., presenter 16) is willing to pay for it (e.g., $90, etc.). FIG. 1C is a sample web-page illustrating how an offer for universal credit could be specified and submitted. As further described in block 20 (and FIG. 1C), the presenter 16, offers to pay $90 for a $100 universal credit. Upon processing this, as well as data provided by the redeemer 12 (e.g., the payment/redemption ratio) and the system provider 14 (e.g., pre-programmed parameters), notification of acceptance (or rejection) can be communicated to the offering party (e.g., presenter 16), further illustrated by FIG. 1D. Furthermore, a system provider could require that, for example, before business credit is issued, payment (or a promise to pay) for the same is provided by a declared date and/or time (a payment deadline).

Figure 1E:
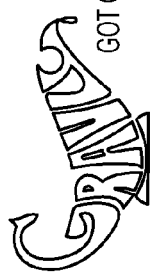
Figure 1F:
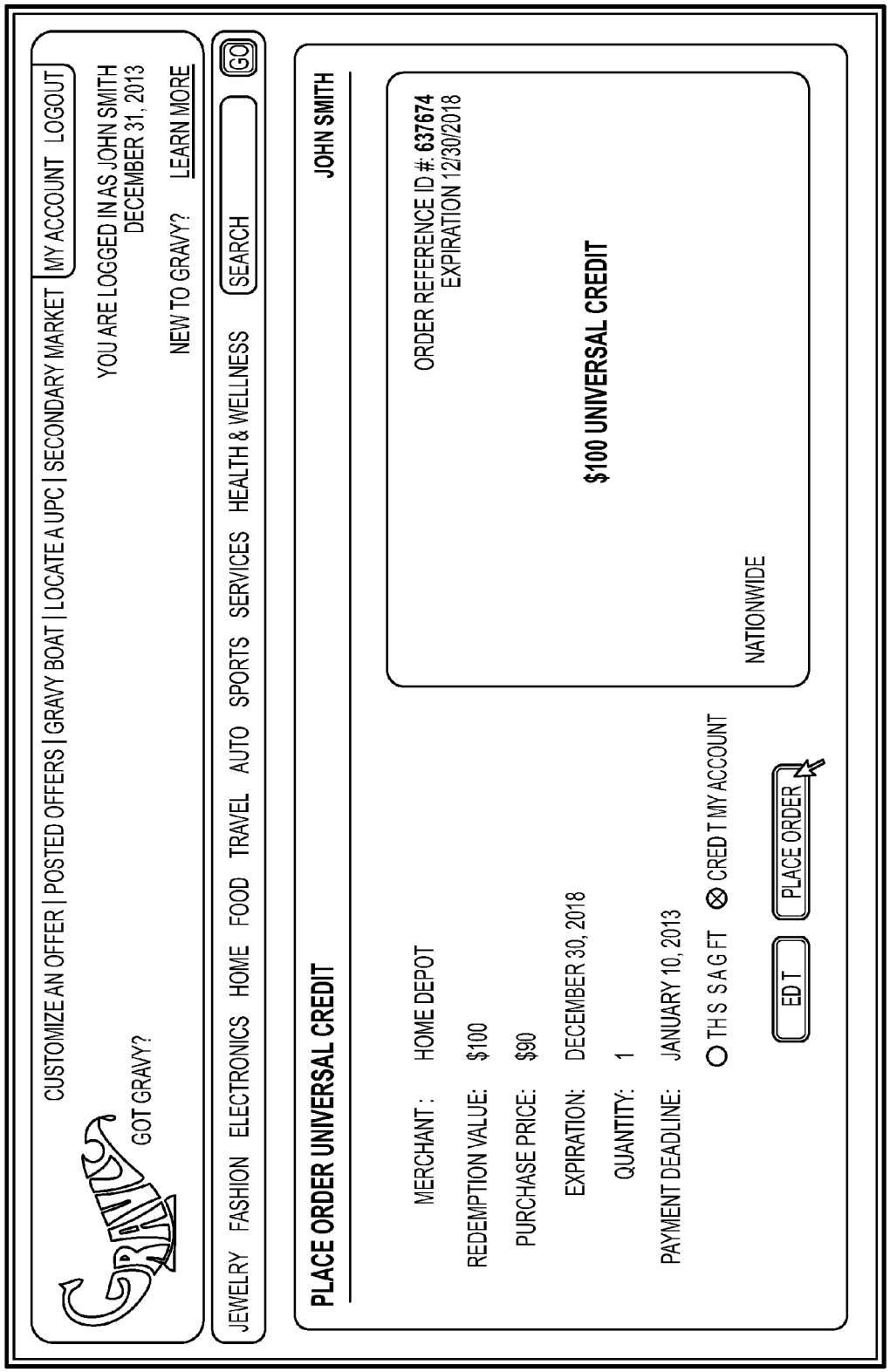
Figure 1G:
FIG. 1G illustrates a sample web-page displaying a business credit account (universal)

As illustrated by FIG. 1E, payments can be made by purchasers utilizing a variety of methods. Such methods include, but are not limited to; cash, credit card, debit card, account transfer, check, ACH, wire, digital cash, etc. Purchasers can place orders and send payment contemporaneously using electronic payment services (e.g., an automated clearinghouse) provided within, or in conjunction with the system. Optionally, a reviewable template of agreed upon terms could be provided to parties prior to final acceptance (e.g., placing an order), as illustrated by FIG. 1F.

As per block 22, the presenter 16 places an electronic order for universal credit, and a $90 payment is provided to, or through the system provider 14. As depicted in block 24 and FIG. 1G, a universal credit is issued (e.g., electronically applied) to an account affiliated with the presenter 16 and held with the system provider 14.

Business credit accounts could be controlled by various parties and funds held in such accounts could belong to various parties (depending upon how the present invention is being implemented). Furthermore such accounts could be set up as escrow accounts. As business credit is issued (e.g., applied to an account affiliated with a purchaser), notification of such can be instantly sent to the affiliated parties (e.g., redeemers, etc.).

Payment processing systems and apparatus (currently in use) can be modified and/or utilized in conjunction with the present invention. Apparatus such as a plastic card incorporating readable media or a smartphone application could be utilized in connection with redemptions, as is commonly done, or electronic transmissions can be sent (e.g., for "online" transactions). Such cards, electronic devices, or other means of storing and/or presenting data could be used in connection with multiple transactions and multiple redeemers. For example, one card could be utilized in connection with multiple transactions and multiple redeemers. As is commonly done, authorization (e.g., from a system provider) may be required during the redemption process.

As shown in block 26 in FIG. 1A, the universal credit is redeemed in connection with a purchase of $100 worth of goods and/or services from the redeemer 12. Data associated with the redemption can be transmitted from the redeemer 12 to the system provider 14 via a network (e.g., the Internet), as indicated by block 28. As per block 30, an $88 payment is sent from the system provider 14, to the redeemer 12. As per this example, the redeemer 12 has received $88 in revenue, the system provider 14 has collected $2, and the presenter 16 has saved $10.

Figure 1H:
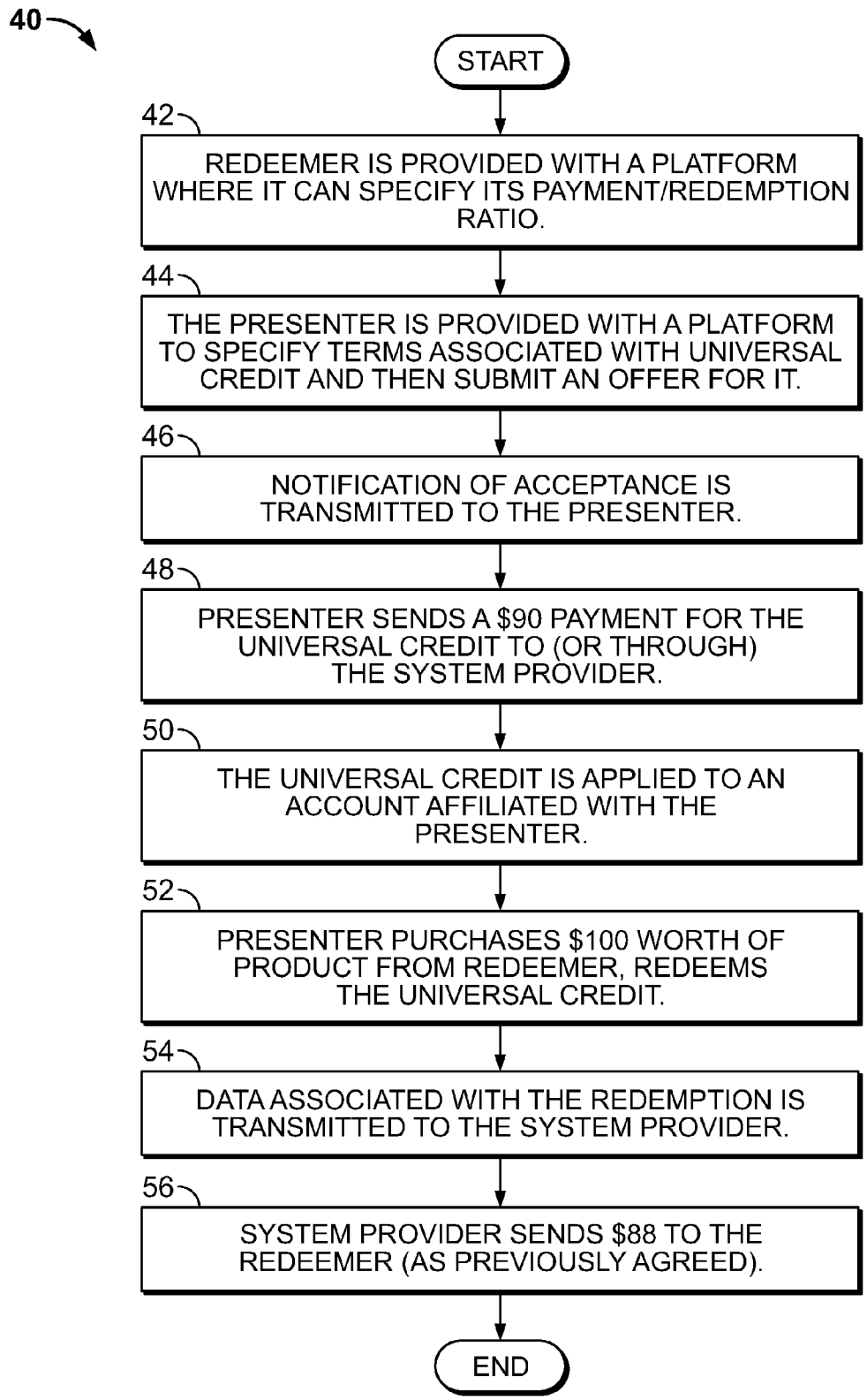
FIG. 1H is a flowchart showing processing steps carried out and depicted in FIG. 1A.

Indicated generally at 40, FIG. 1H is a flowchart showing processing steps carried out via the system and depicted in FIG. 1A. In step 42, a redeemer is provided with a platform where it can specify and transmit a desired payment/redemption rate (and does so). In step 44, a platform is provided to a purchaser/presenter and utilized to specify and transmit multiple terms associated with universal credit and offers therefore. Upon processing data provided by the redeemer and the presenter, as well as data (e.g., acceptable pre-programmed parameters) provided by the system provider, the system provider notifies the presenter that its offer is accepted and approved, as described in step 46. In step 48, the presenter sends a $90 payment for universal credit (with a $100 redemption value) to, or through the system provider. As per step 50, the system provider electronically issues the universal credit to an account affiliated with the presenter. As indicated by step 52, the universal credit is redeemed in connection with a $100 purchase of product from the redeemer. In step 54, data associated with the universal credit redemption is transmitted from the point of the redemption to the system provider. Finally, as indicated by step 56, the system provider sends $88 (as full payment for the redemption) to the redeemer (as previously authorized).

Figure 2A:
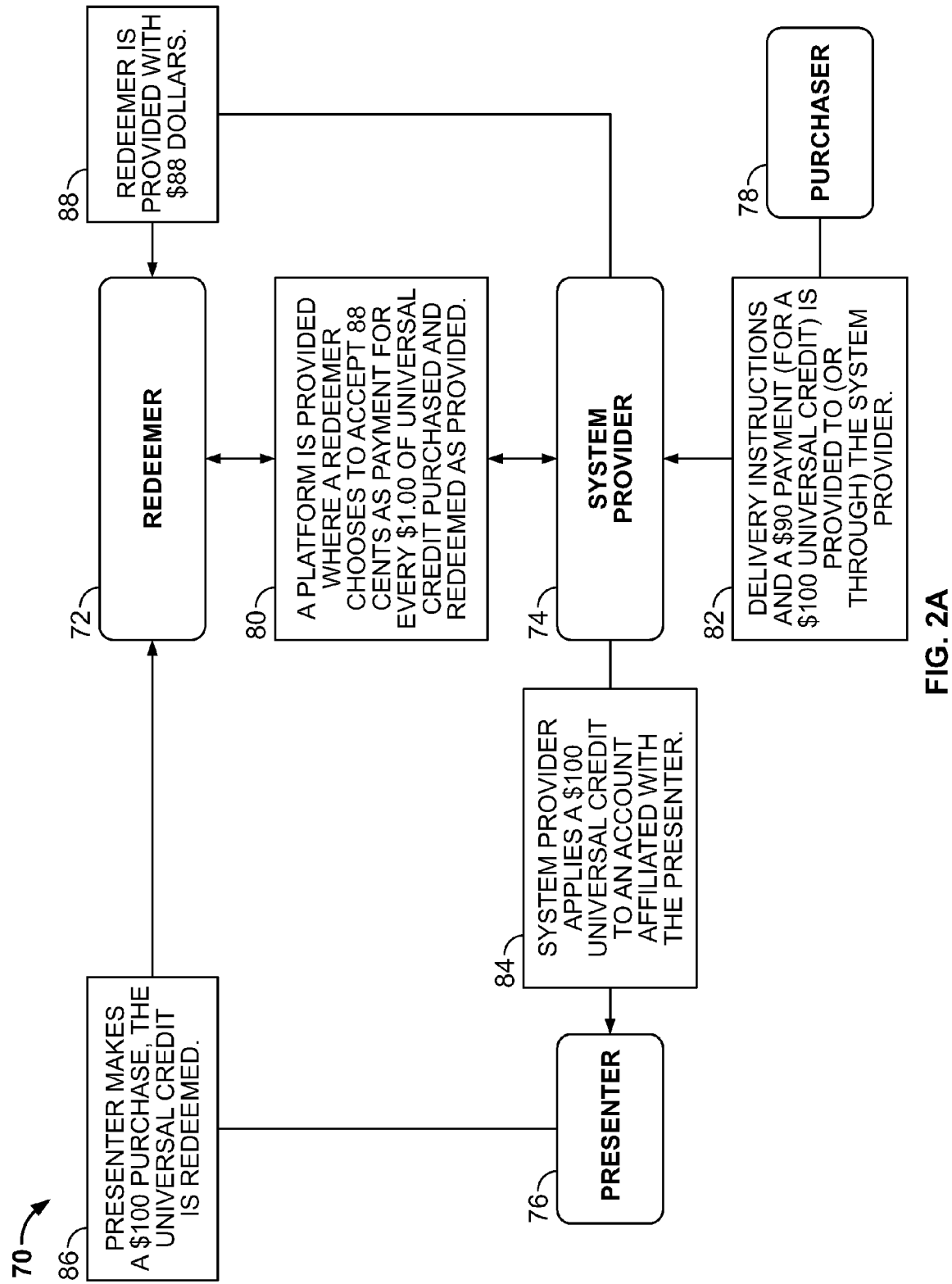
FIG. 2A is a diagram showing an example of an embodiment of the system, wherein business credit is gifted.
Figure 2B:
FIG. 2B is a sample web-page illustrating how a purchaser can provide contact information associated with a gift recipient.

FIG. 2A is an example of an embodiment of the present invention where business credit is gifted, generally indicated by 70. Credit could be similarly gifted in other embodiments of the present invention, as well. As per block 80, the redeemer 72 is provided with a platform where it can specify a payment/redemption ratio. As per the example, the redeemer 72 has chosen to receive 88 cents as payment for every $1.00 of universal credit redeemed. Such a platform could also be provided, for example, where the payment amount specified is the minimum amount a redeemer agrees to accept, and where a system provider must tack on a pre-agreed to percentage/fee, and any balance between the offered amount and the accepted and approved amount can be provided to the redeemer, split, deducted from the eventual purchase price, etc.

As referenced, a purchaser can utilize the present invention to purchase credit as well as transfer (give or sell) and/or use the same. Not shown in FIG. 2A, a platform is provided where a purchaser 78 can specify and submit multiple terms associated with universal credit and offers therefore. Also not shown, the purchaser 78 communicates such an offer (e.g., to pay $90 for a $100 universal credit), as well as notification that a resulting purchase would be a gift, to the system provider 74. Also not shown in FIG. 2A, upon processing the data (e.g., the desired payment/redemption rate) entered by the redeemer 72, the purchaser 78 (e.g., the $90 offer), and pre-programmed parameters provided by the system provider 74, notice that its offer is accepted and/or approved is transmitted to the purchaser 78. Upon such notification, a platform can be provided to a purchaser (e.g., purchaser 78) where the name and e-mail address of a gift recipient (e.g., presenter 76) can be communicated (e.g., to the system provider 74), as further illustrated by FIG. 2B. As per block 82, a platform is provided where a $90 payment can be sent to (or through) the system provider 74.

Figure 2C:
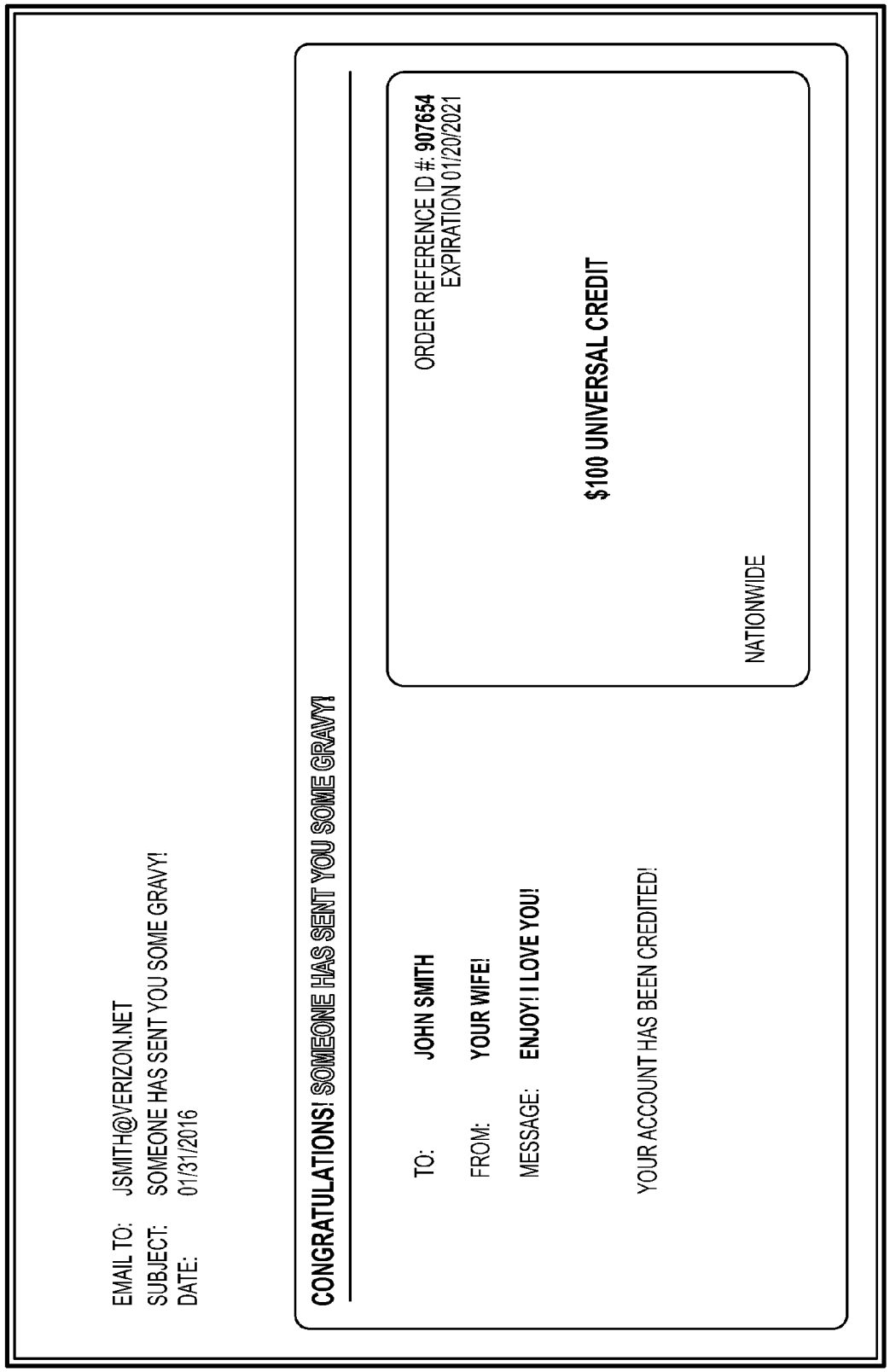
FIG. 2C is a sample email transmission from a system provider to a gift recipient.
Figure 2D:
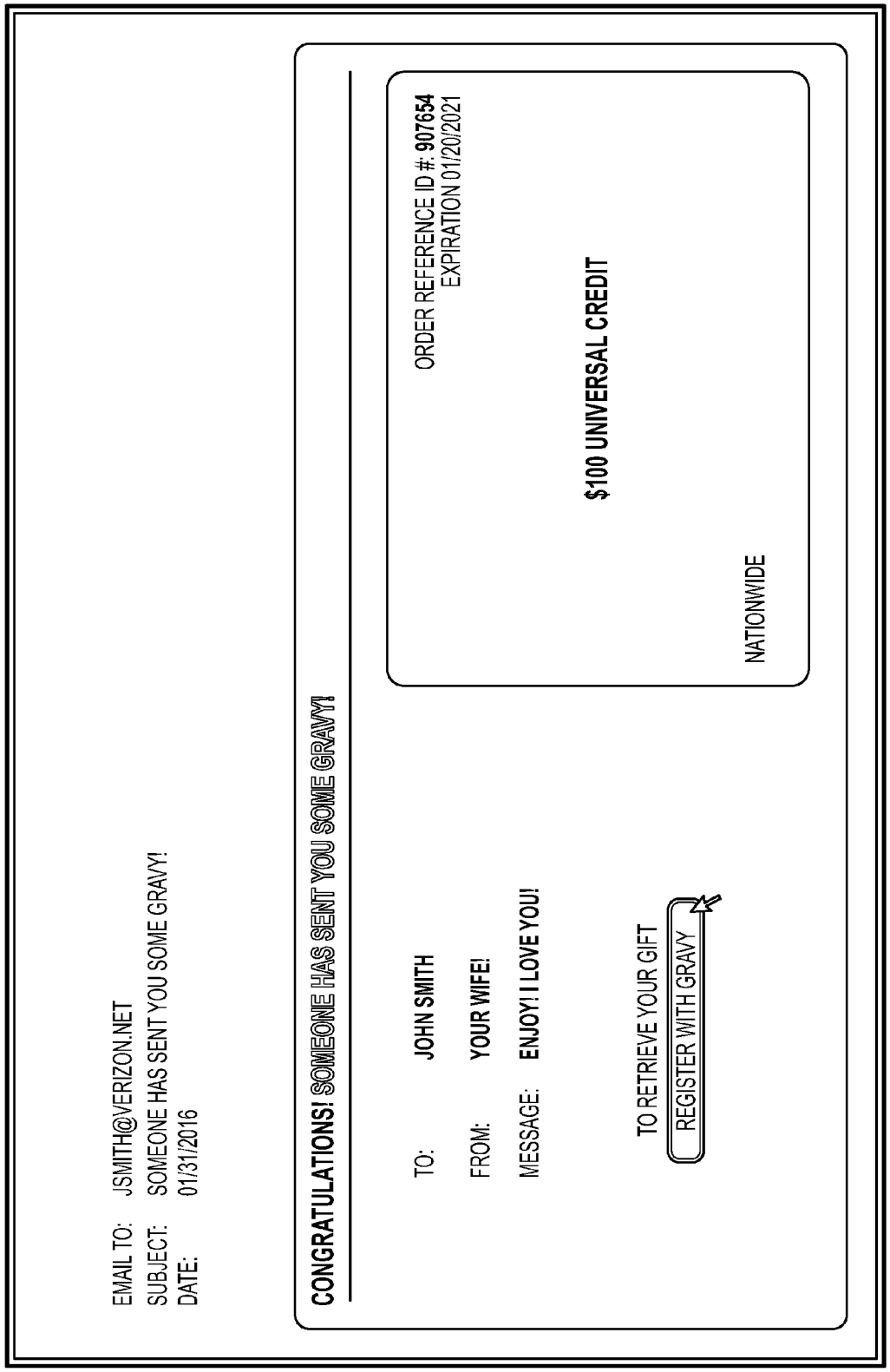
FIG. 2D is a sample e-mail transmission from a system provider to a gift recipient (not recognized by the system as having an account)

As illustrated in FIG. 2C and further described in block 84, an e-mail is sent to the presenter 76, indicating that a universal credit has been applied to an account affiliated with the presenter 76. If the presenter is not affiliated with the system, an e-mail such as the one depicted in FIG. 2D could be sent. Thus the present invention provides a method for acquiring (e.g., registering) users.

As described in block 86, upon being notified of the gift, the presenter 76 could redeem the universal credit in connection with a purchase (or multiple purchases) with an affiliated redeemer 72. Of note, a system provider or a vendor could offer universal credit that can be redeemed via multiple redeemers (e.g., a fast-food franchise [a vendor] might offer universal credit where the affiliated redeemers are its franchisees). Not shown in the diagram, upon a redemption, associated data can be transmitted from redeemers to system providers (and other parties) and the account affiliated with the authorized presenter can be automatically updated, in connection with the redemption. Finally, as per block 88, the system provider 74 sends an $88 payment to the redeemer 72.

As mentioned above, targeted credit is redeemable in connection with particular products (e.g., products sharing the same UPC). Embodiments of the present invention enable various parties (e.g., vendors) to provide targeted credit. Targeted credit could be bought, sold, gifted, won, inherited and/or provided in any conceivable way (e.g., offered for sale in a retail store).

Universal Product Codes (UPC), Stock keeping Units (SKU), or other suitable manners of identification can be utilized to create, redeem and/or process, etc., targeted credit. Targeted credit can also be affiliated with particular redeemers (e.g., utilizing Employer Identification Numbers). Coded readable media (e.g., bar codes) and code reading devices (e.g., laser scanners) could be utilized in identifying products affiliated with targeted credit.

The term "vendor" as used herein, refers to persons or entities who supply redeemers with products (e.g., wholesalers, distributers, manufacturers, etc.). Targeted credit could be purchased at a price that is less than the full redemption value of the targeted credit, providing obvious benefits to purchasers and enabling other parties (e.g., vendors) with systems and methods to promote their products. Targeted credit could be provided on a dollar for dollar basis. Targeted credit can be affiliated with a vendor's products at a shared cost, or perhaps no cost to the affiliated vendor, providing benefits to such vendors. Targeted credit could be affiliated, for example, with goods that are discontinued or overstocked, or services that traditionally provide larger profit margins, providing obvious benefit to both vendors and redeemers.

Figure 3B:
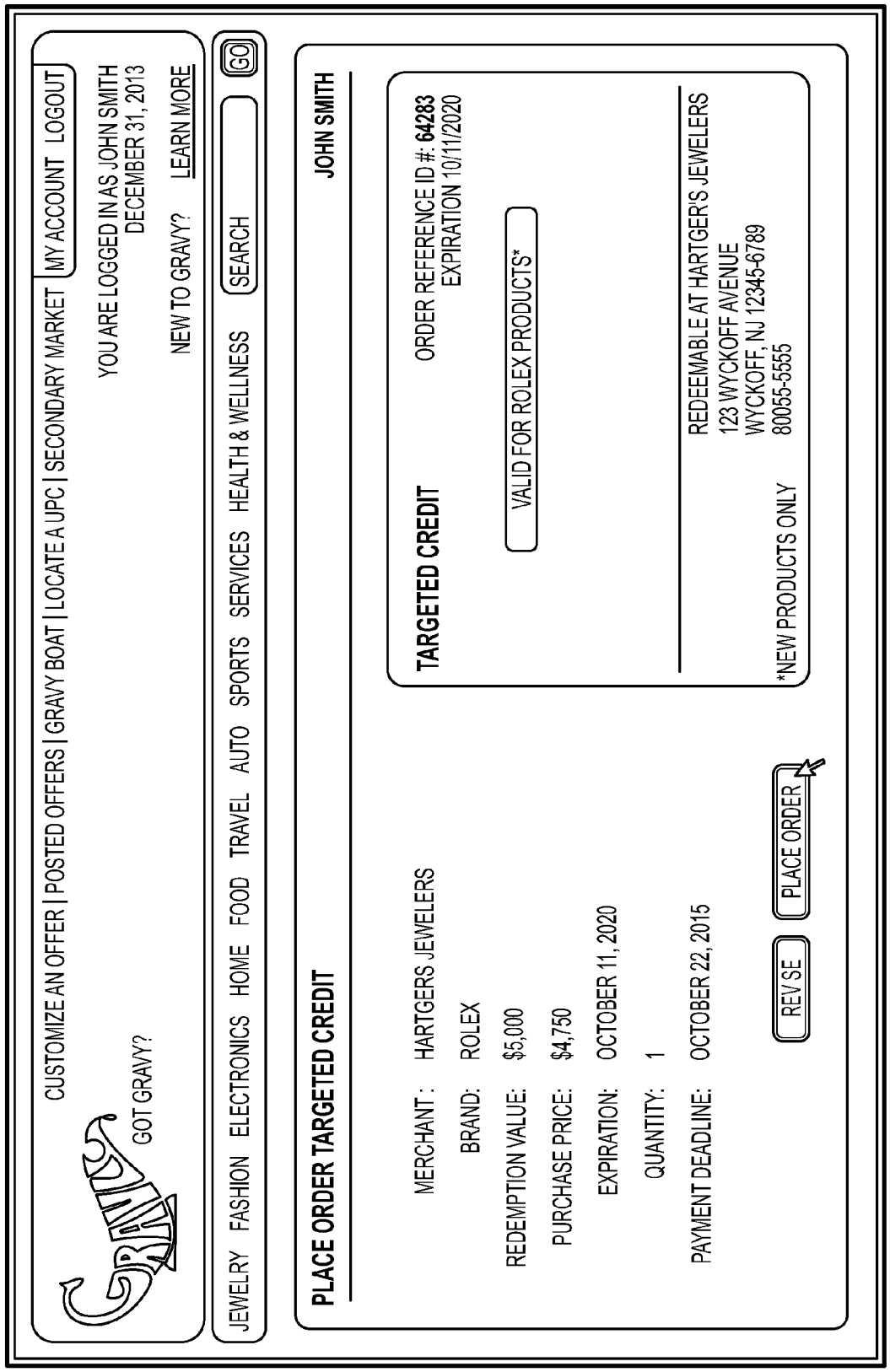
FIG. 3B illustrates a sample web-page that could be used to place an order for business credit.

FIG. 3A is a diagram showing an example of a system and method for providing targeted credit, indicated generally by 100. Not shown in the diagram, a redeemer 102 is provided with a platform where it can specify payment/redemption rates, and as per this example, chooses to be paid 100 cents on the dollar for redemptions. As described in block 110, a vendor 108 is provided with a platform where it can provide incentive (promoting the sale of credit exclusively targeted to the same vendor's products) by authorizing as per this example, a system provider 104 to charge or debit a monetary amount (e.g., a monetary amount equaling 10% of the monetary amount being redeemed) from a traditional bank account the vendor 108 has with the system provider 104. Not shown in the diagram, an offer for targeted credit has been accepted and/or approved for purchase, and an order is placed. As described in block 112 and illustrated in FIG. 3B, the presenter 106 places an order and sends a $4,750 payment to (or through) the system provider 104 for a $5,000 targeted credit (targeted towards products supplied by the vendor 108). As indicated in block 114, a $5,000 targeted credit is applied to an account affiliated with the presenter 106 (also see FIG. 3C). As described in block 116, the targeted credit is redeemed in connection with a purchase of specified products (e.g., identified by UPC) from the redeemer 102.

As expressed in block 118, data (e.g., identifying the redeemer 102, the time of purchase, and the specific products purchased) is automatically transmitted to the system provider 104, from the point of the redemption. Such data can be forwarded to the vendor 108, as described in block 120. As further described in block 120 (and as previously authorized), a $500 incentive is debited (e.g., charged as a marketing fee)

from a traditional bank account the vendor 108 keeps with the system provider 104. Such incentives could be directed to various parties via various means and achieve the same end, as would be understood by one skilled in the art. For example, incentive could be provided to purchaser/presenters in the form of coupons or rebates, or provided as credit to a redeemer (applicable to a vendor's account with the redeemer), or simply as additional funds to be considered by a system provider. As indicated by block 122, a $5,000 payment is sent from the system provider 104 to the redeemer 102 (i.e., the redeemer's bank account).

Figure 4A:
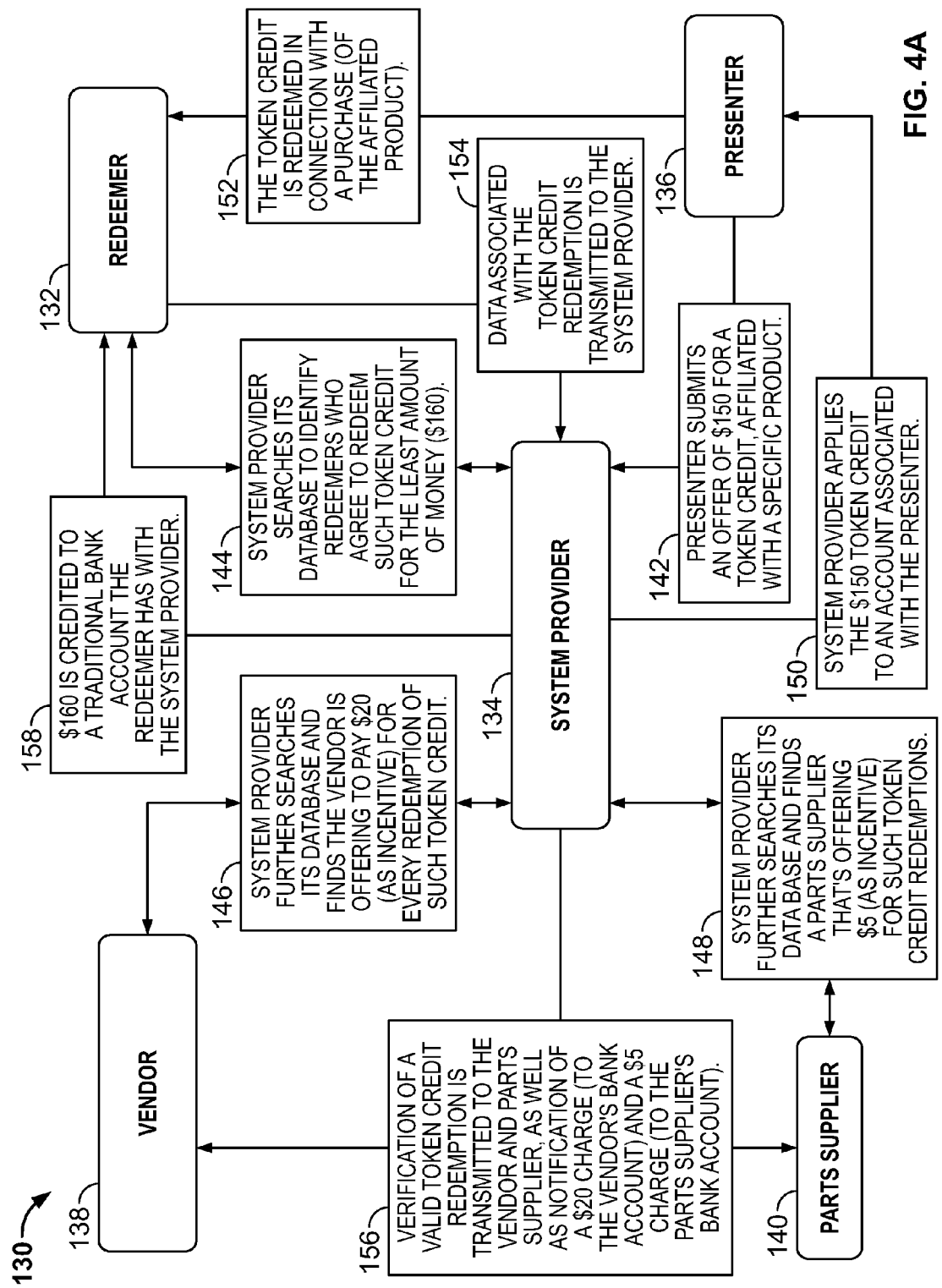
FIG. 4A is a diagram showing an example of another embodiment of the system wherein a method for joint promotion is provided and token credit is utilized.

The present invention enables various parties to jointly promote the sale of business credit, as well as the sale of products the credit can redeemed in connection with. The present invention enables various parties to be recognized for providing such incentive, or for various reasons, choose not to receive such recognition. FIG. 4A is a diagram showing an example of such an embodiment, generally indicated by 130, where token credit is utilized. As discussed above, token credit is redeemable in connection with a purchase of a specific product (e.g., identified by UPC), regardless of the asking price (of the product). As provided in. FIG. 4A, a system provider 134, a presenter 136, a redeemer 132, a vendor 138, and a parts supplier 140 are able to communicate utilizing computer systems and communication links via a network.

Figure 4B:
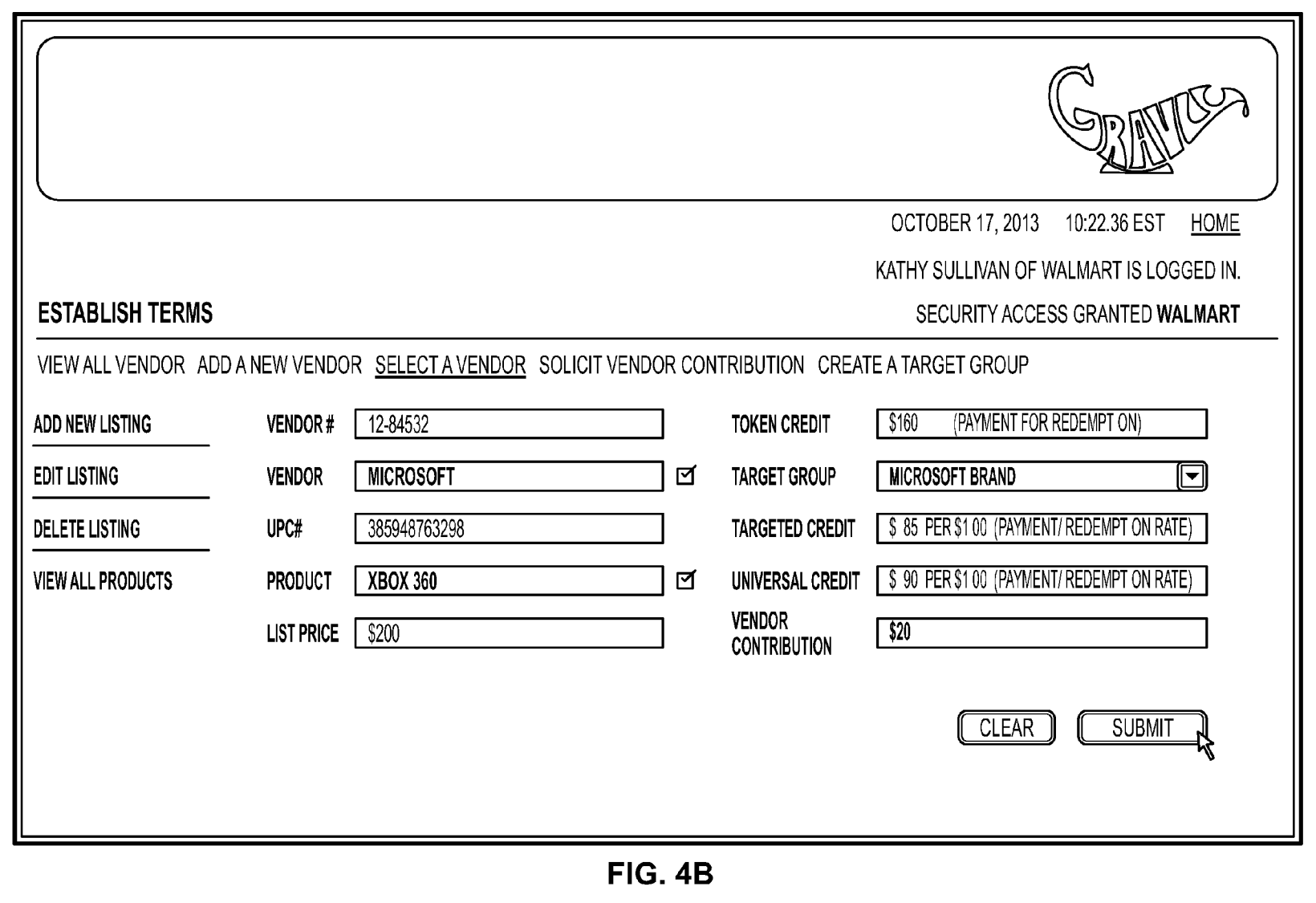
Figure 4D:
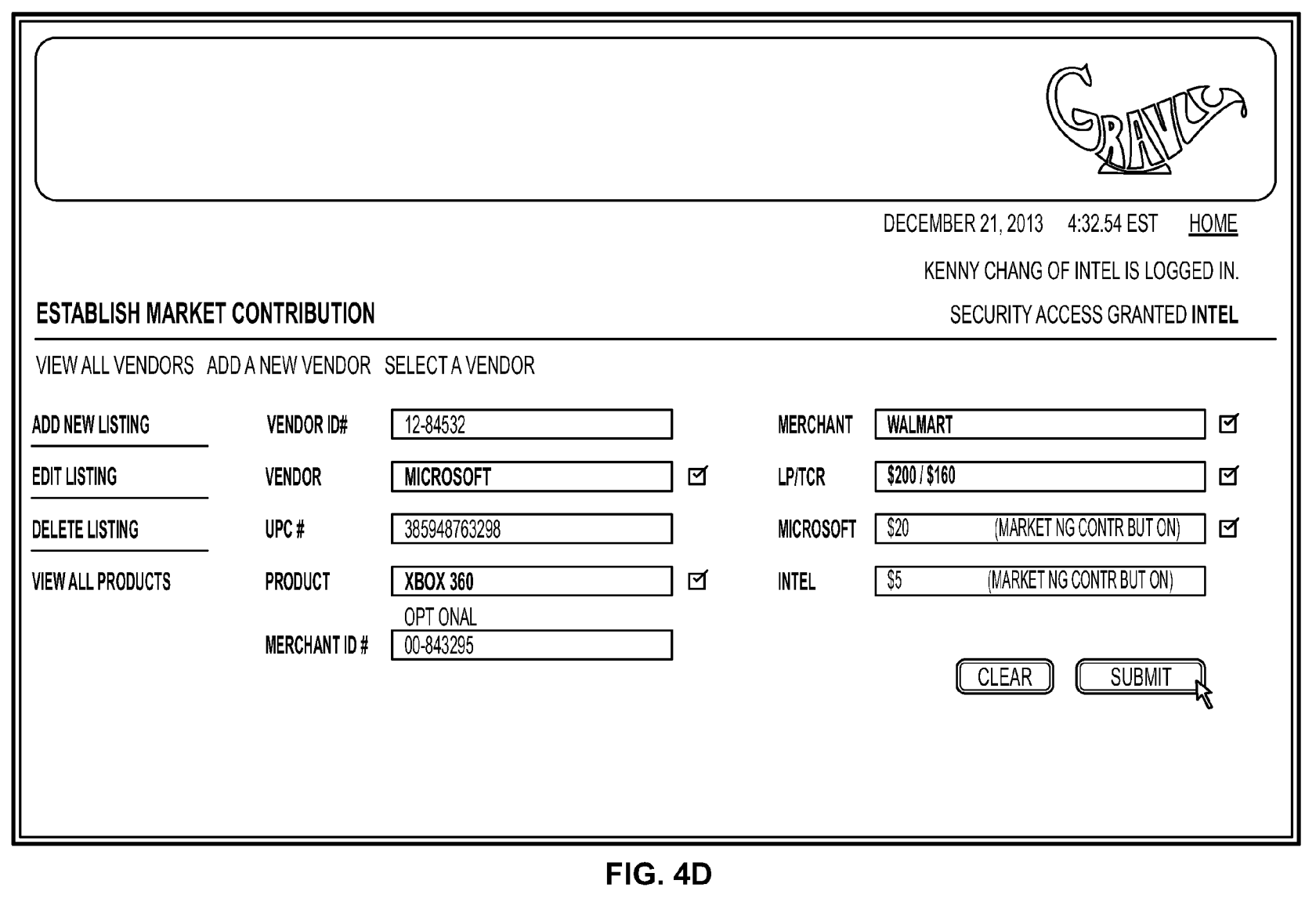

As illustrated by FIGS. 4B, 4C, and 4D (sample webpages), a platform can be provided where various parties can promote the selling of token credit, as well as the affiliated product. FIG. 4B illustrates a sample web-page where a redeemer (an international retail chain) can specify a monetary amount (e.g., $160) that it agrees to accept as payment in connection with token credit redemptions (affiliated with a specific video game console). In FIG. 4C, a vendor is provided with a platform where it can further promote the selling of such token credit, by authorizing $20 to be charged from a bank account it keeps with the system provider, for every token credit (affiliated with the video game console) that is purchased and redeemed as specified. Furthermore, as previously mentioned, parties can be provided with a platform where they can communicate with one another, and as per this example (but not depicted within the figures), a parts supplier is contacted and asked by the vendor to further contribute to the promotion. As depicted in FIG. 4D, the parts supplier authorizes $5 to be charged from a bank account that it keeps with the system provider, for every token credit (affiliated with the video game console) to the promotion, in connection with valid purchases and redemptions of the token credit.

Figure 4E:
FIG. 4E illustrates a sample web-page where offers to purchase token credit can be made.

As described in block 142 and depicted in FIG. 4E, the presenter 136 submits a $150 offer to the system provider 134 for token credit affiliated with the video game console (utilizing the UPC). As designated by block 144, the system provider 134, via its processing server, can electronically search (e.g., a database) to identify redeemers who will redeem the token credit for the least amount of money. As provided by this example, the system provider 134 determines the $160 entry by redeemer 132 to be the lowest. The system provider 134, as depicted in block 146, can further electronically search (e.g., a database) to see if the vendor 138 provides (or is willing to provide) additional incentive affiliated with the token credit. As further depicted in block 146, the system provider 134 determines (via its processing server) that the vendor 138 has authorized $20 charges (e.g., in the form of a marketing fees) to be applied to a traditional bank account the vendor 138 has with the system provider 134 in connection with validly purchased and redeemed token credit (affiliated with the video game console).

As shown in block 148, the system provider 134 (via a processing server) searches to see if additional parties are providing similar incentive in connection with such token credit. In this regard, the system provider 134 identifies that a parts supplier 140 (who supplies microchips to the vendor 138 for the video game console) has authorized $5 charges (e.g., for marketing fees) to be applied to a traditional account the parts supplier 140 keeps with the system provider 134, in connection with valid redemptions of the aforementioned token credit. Upon processing the funds it can take in versus the funds it would have to pay, as well as pre-programmed parameters entered by the system provider 134, notice indicating acceptance and/or approval, of the presenter's offer can be communicated to the presenter 136 (as well as various other parties), and can be immediately binding.

Also not shown in FIG. 4A, the system provider 134 charges $150 (as previously authorized) to a traditional bank account affiliated with the presenter 136 as payment for the token credit (other methods of payment could also be used). As described in block 150 (and further illustrated in FIG. 4F), the system provider 134 can apply the token credit to an account affiliated with the presenter 136. Universal credit, targeted credit and, token credit could be applied to a single account, or to separate accounts (as depicted in the figures).

Using a mobile phone application (provided by the system provider 134) as a redemption apparatus, the token credit is redeemed in connection with a purchase of the video game console from the redeemer 132, as designated by block 152. As indicated by block 154, data associated with the token credit redemption is transmitted to the system provider 134 from the point of the redemption. As designated by block 156, the system provider 134 transmits data verifying the valid token credit redemption to the vendor 138 and $20 is charged (e.g., as a service fee) to a traditional bank account the vendor 138 keeps with the system provider 134. Confirmation of the valid token credit redemption is also transmitted to the parts supplier 140, and the system provider 134 similarly debits $5 from a traditional bank account that it keeps for the parts supplier 140. Finally, as indicated by block 158, the system provider 134 sends $160 to the redeemer 132, as payment for the token credit redemption. It is of note that the redeemer 132 collected $160 as payment for the token credit redemption, yet the presenter 136 purchased the token credit for $150.

The present invention can also be implemented where payments for business credit (including store credit) are made in two steps, at different times (a "double payment method"). In this embodiment, an initial payment is made to enable the payer to specify and/or secure (for a stated period of time) terms associated with business credit and offers for the same, and an optional second payment is made (at a different time and perhaps by a different party) for obtaining the credit. This method could be viewed or implemented in various ways. For example, the first payment could be viewed or implemented as a "down payment" and the second as a final payment that completes the transaction. Furthermore, the first payment could be viewed or implemented as a service fee for securing terms, and the second as payment solely for the business credit. Alternatively, the double payment method could be viewed and/or implemented where a first payment is used to purchase an option that can be exercised within a stated period of time and enables the option holder to purchase the affiliated credit at a specified price, and where a second payment is made in connection with the exercising of the option (i.e., acquiring the affiliated credit). Agreements could insure that options are exercised as provided.

Double payment methods could be used in conjunction with previously discussed embodiments of the present invention as well. For example, a purchaser could customize multiple terms associated with token credit and offers therefore (where multiple parties provide incentive and/or contribute to a promotion) and upon acceptance, a platform can be provided where an option to extend the payment deadline affiliated with the accepted offer could be purchased (see FIG. 5B).

Figure 5A:
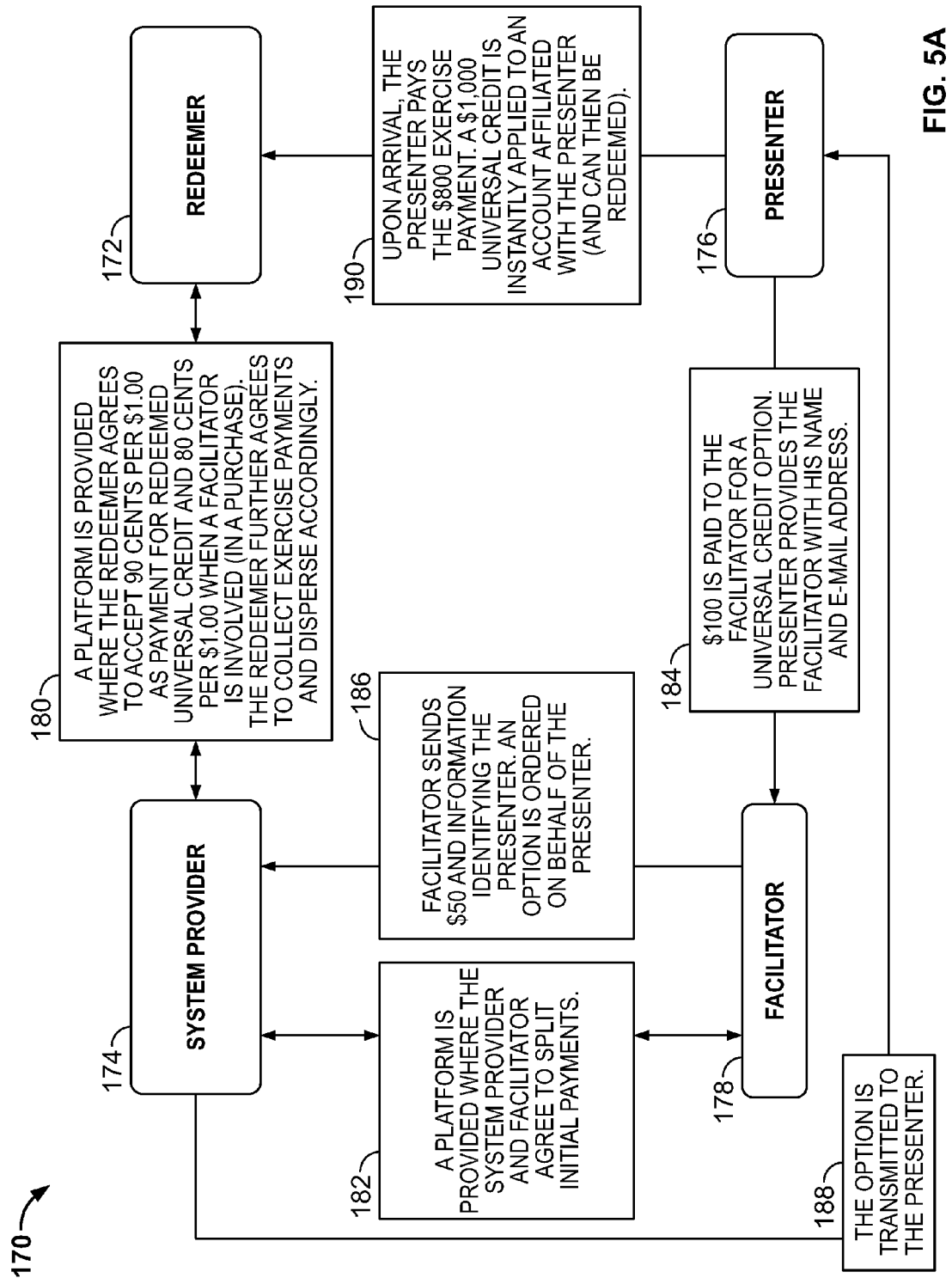
FIG. 5A is a diagram showing an example of another embodiment of the system wherein a double payment method is utilized and a facilitator is involved.
Figure 5B:
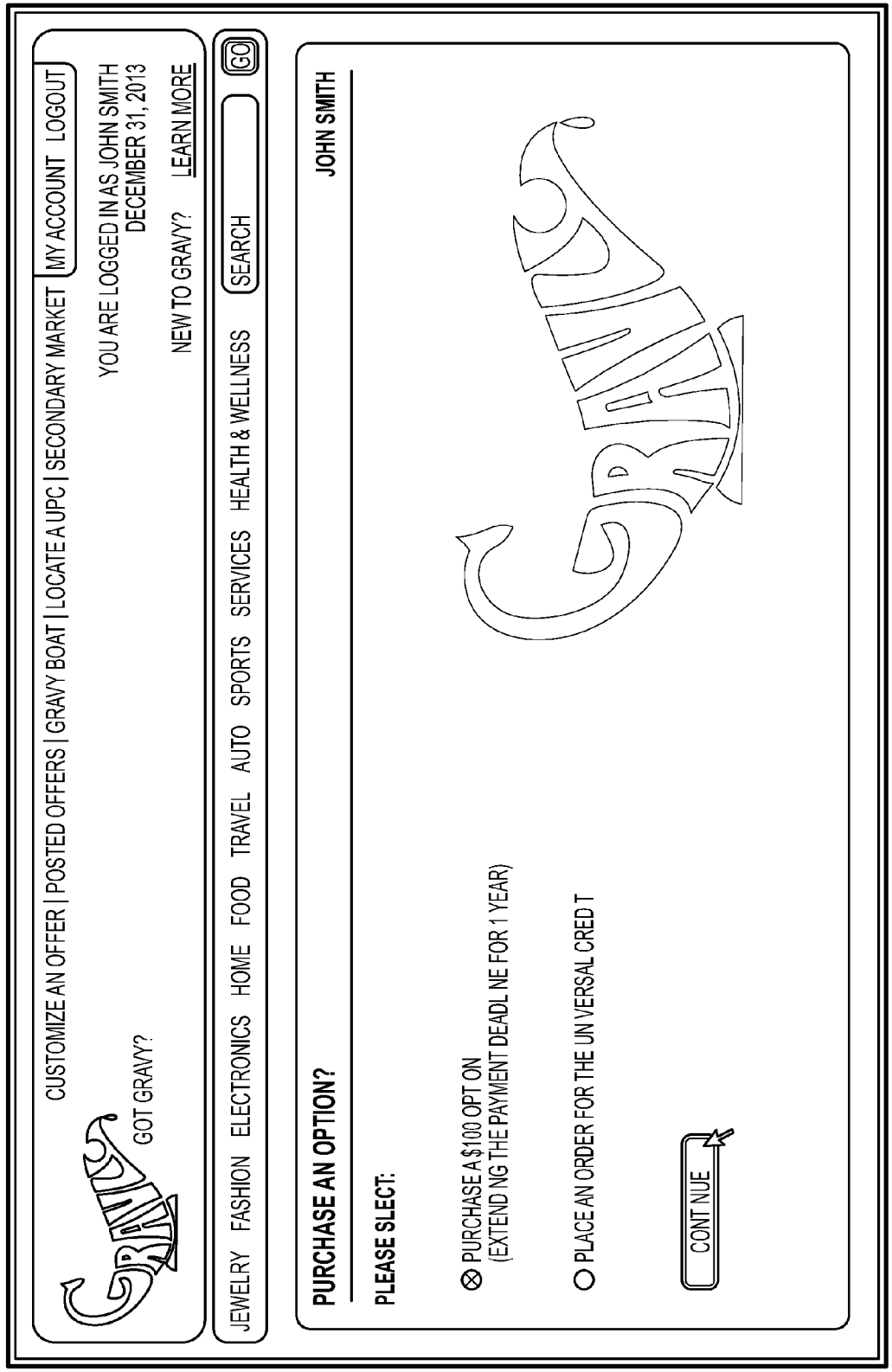
FIG. 5B is a sample web-page illustrating how an offer to purchase an option could be presented.

FIG. 5A is a diagram showing an example of an embodiment of the present invention where a double payment method is utilized and a facilitator is involved, indicated generally at 170. The term "facilitator" as used herein, refers to persons or entities (e.g., agents, independent sales representatives, franchisees, referring parties, retail stores, [even gift givers], etc.) that are compensated for facilitating purchases of business credit and options thereof.

FIG. 5A illustrates an example of an embodiment of the system where a facilitator 178 initiates the sale of an option for universal credit. As described in block 180, a platform (e.g., a web-page, etc.) can be provided where two payment/redemption ratios can be specified by a redeemer 172, a "standard" payment/redemption ratio (e.g., similar to the one described in FIG. 1A), and a second payment/redemption ratio, where lower payments can be specified for redemptions of business credit (e.g., universal credit) in which facilitators played a role in providing. Here, the payment/redemption rate used for a particular redemption can be dictated by whether or not a facilitator played a role, with regards to the purchase of business credit or options therefor. Indicated by block 182, a platform is provided where the facilitator 178 and the system provider 174 agree to split (e.g., 50/50) the purchase price of options sold in which the facilitator 178 played such a role. Of course, there are many ways a facilitator could be compensated within the scope of the present invention.

As described in block 184, a $100 payment, as well identification information such as the presenter's name and e-mail address is provided to the facilitator 178. As per block 186, the facilitator 178 uses the system to place an order and provide payment (e.g., $50) on behalf of the presenter 176, as well as provide the previously mentioned identification information to the system provider 174 (via the Internet). As described in block 188 and further depicted in FIG. 5C, an option for a $1,000 universal credit is applied to an account affiliated with the presenter 176.

A second payment can be provided to a system provider, or as per what transpires within this example, the redeemer 172. Here, the redeemer 172 collects an $800 "exercise payment" (from the presenter 176) on behalf of the system provider 174, which can then be used as payment to the redeemer 172 for the future redemption of the universal credit (as previously agreed). A platform is provided to the redeemer 172 where notice (e.g., that the $800 exercise fee has been received) is communicated to the system provider 174. Upon processing this information, a $1,000 universal credit can be instantly and automatically applied to an account affiliated with presenter 176. The present invention also provides systems and methods where business credit (including store credit) can be organized, monitored and/or accounted for, as per FIG. 5D.

FIG. 6 is a diagram showing an example of an embodiment of the present invention, indicated generally at 200, where a system provider 204 pays a redeemer 202 (e.g., a landlord) in connection with the issuance of business credit, prior to the redemption of the business credit. This embodiment can be ideally used in association with monthly expenses and/or commitments (e.g., utilities, insurance, rent, equipment leases, off balance sheet financing, etc.). This embodiment can also be ideally used by redeemers who offer payment terms (e.g., wholesalers, distributers and manufacturers, etc.).

As per this example, the redeemer 202 (e.g., a landlord) uses the system to raise cash by selling or leveraging committed future revenue (e.g., future rent roll). As described in block 208, the redeemer 202 is provided with a platform where it can specify terms regarding universal credit and offers therefore. Such terms may include a date in which the proposed universal credit must be redeemed (if an offer is accepted), the redemption value of the universal credit (that the redeemer 202 agrees to honor), the monetary amount the redeemer 202 is to be paid in connection with such redemptions, the dates such funds are to be provided by, etc. As per this example, the redeemer 202 agrees to redeem between $1,000,000 and $2,000,000 worth of universal credit (between Jan. 1, 2015 and Dec. 31, 2017), if it is provided with funds equaling 90% of the redemption value of the said universal credit before Nov. 30, 2014.

Indicated in block 210, a platform is provided where communication between the system provider 204 and a presenter 206 (e.g., a tenant of the redeemer 202) can transpire. As per this example, the system provider 204 offers universal credit to the presenter 206 (and other tenants of the landlord) at a price equaling 95% of the redemption value of the universal credit (perhaps contingent upon a minimum amount of funds being provided to the redeemer 202 before Nov. 30, 2014). As per block 212, the presenter 206 places an order for $1,000,000 worth of universal credit and provides a $950,000 payment to the system provider 204.

Furthermore, as per this example, the system provider 204, purchases an additional $500,000 (redemption value) worth of the proposed universal credit to resell (considering that universal credit derived from the redeemer's offer would not expire for another two years). Thus, as described in block 214, the system provider 204 sends $1,350,000 to the redeemer 202 before Nov. 30, 2014. As depicted in block 216, a $1,000,000 universal credit is transmitted to an account affiliated with the presenter 206.

As described in block 218, valid presentation of the $1,000,000 universal credit is made by the presenter 206, via an electronic transmission through the Internet, and the universal credit is redeemed. As per block 220, proof of redemption can be transmitted to the system provider 204 and (not depicted) forwarded to the presenter 206. Furthermore, as indicated in block 222, the redeemer 202 can apply the credited amount to the presenter's regular monthly statement (as previously agreed).

Figure 7:
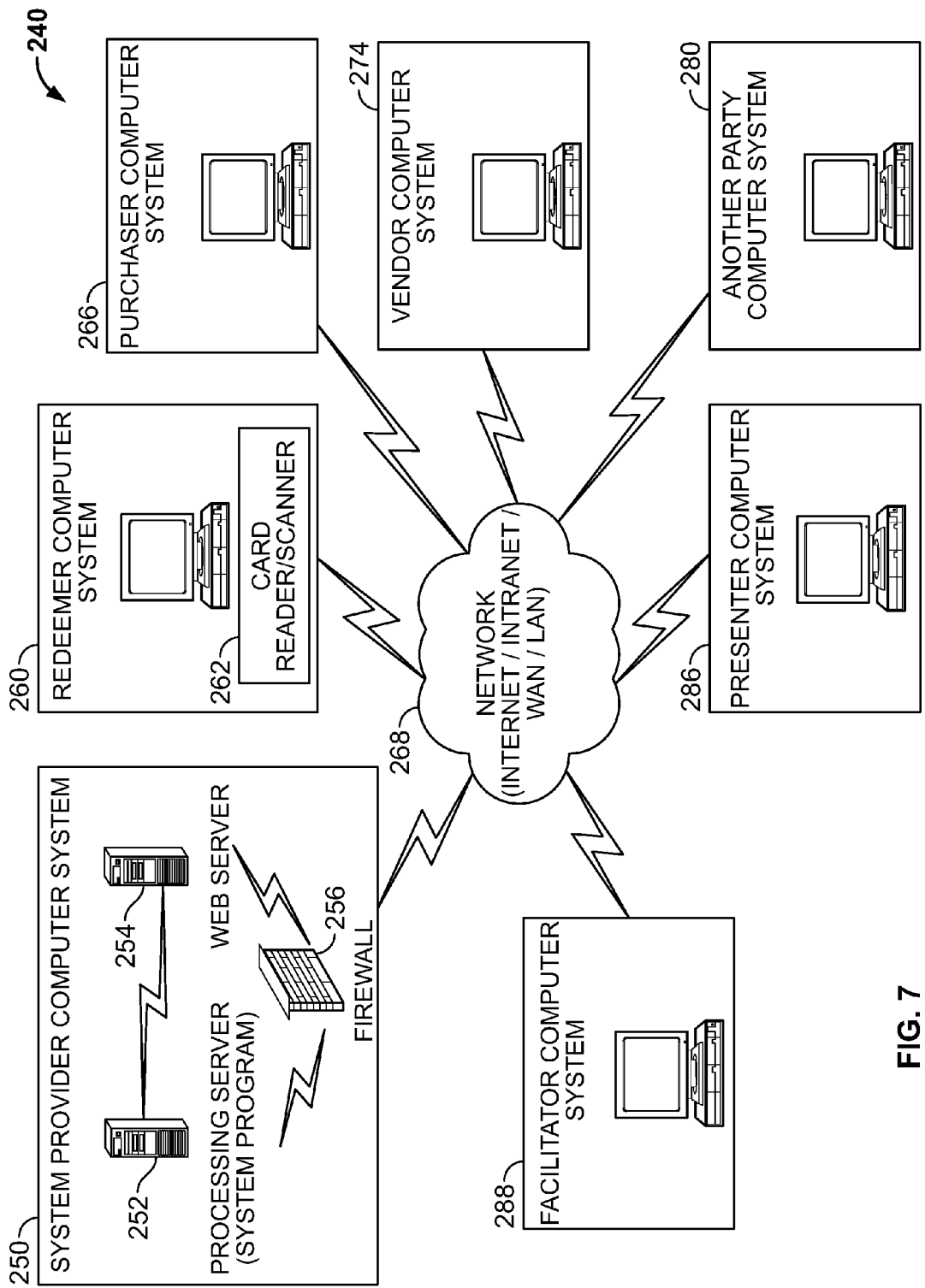
FIG. 7 is a diagram showing sample components which can be used to implement the present invention.

FIG. 7, indicated generally by 240, is a diagram showing sample components that can be utilized to implement the present invention. The components depicted in FIG. 7 and discussed herein are not intended to limit the spirit or scope of the present invention. The present invention can be implemented using a network 268, a first communication link between a redeemer computer system 260 and the system provider computer system 250, a second communication link between the system provider computer system 250 and a purchaser computer system 266 could enable similar communication. Such communication could encompass the sending and receiving of data, business credit and funds from party to party. Other communication links between the system provider computer system 250, a vendor computer system 274, a presenter computer system 286, a facilitator computer system 288, or another party's computer system 280 can be similarly utilized, via the network 268.

Examples of a network 268 could include; the Internet, an intranet, a wide area network (WAN), a local area network (LAN), etc. The computer systems 260, 266, 274, 280, 286, and 288, for example, could each be any suitable computer system having the ability to communicate via the network 268

(e.g., having Internet connectivity), which may for example, be similar to the system provider computer system 250, or a personal computer, a laptop computer, a tablet computer, a smartphone, etc. The servers 252 and 254 could include single or multiple processors (or a single processor having multiple processor cores), and could include any suitable operating system and associated system software, such as the UNIX operating system, Linux, Microsoft Windows, etc. Furthermore, the functions performed by the servers 252 and 254 could be provided by a single computer system, or by multiple networked computer systems (e.g., "cloud" or "grid" computing).

As depicted in FIG. 7, a system provider computer system 250 could include a processing server 252, which could provide much of the functionality and processing described throughout the specification. A web server 254 can host a website that could be utilized as previously described, and a firewall 256 that can provide security for the servers 252 and 254. It shall be understood that the method steps associated with the present invention could be performed, at least in part, via computer-executable instructions stored on computer-readable media.

Card readers and/or code reading scanning devices 262, etc., could also be utilized within, or in conjunction with the present invention, and data interpreted and collected by them could be similarly communicated via the network 268 as would be understood by on skilled in the art. Other electronic means for conveying information such as, but not limited to wireless digital transmissions, electronic cards (e-card), e-mail, text messaging (SMS), etc., could also be utilized within, or in conjunction with the present invention.

Figure 8:
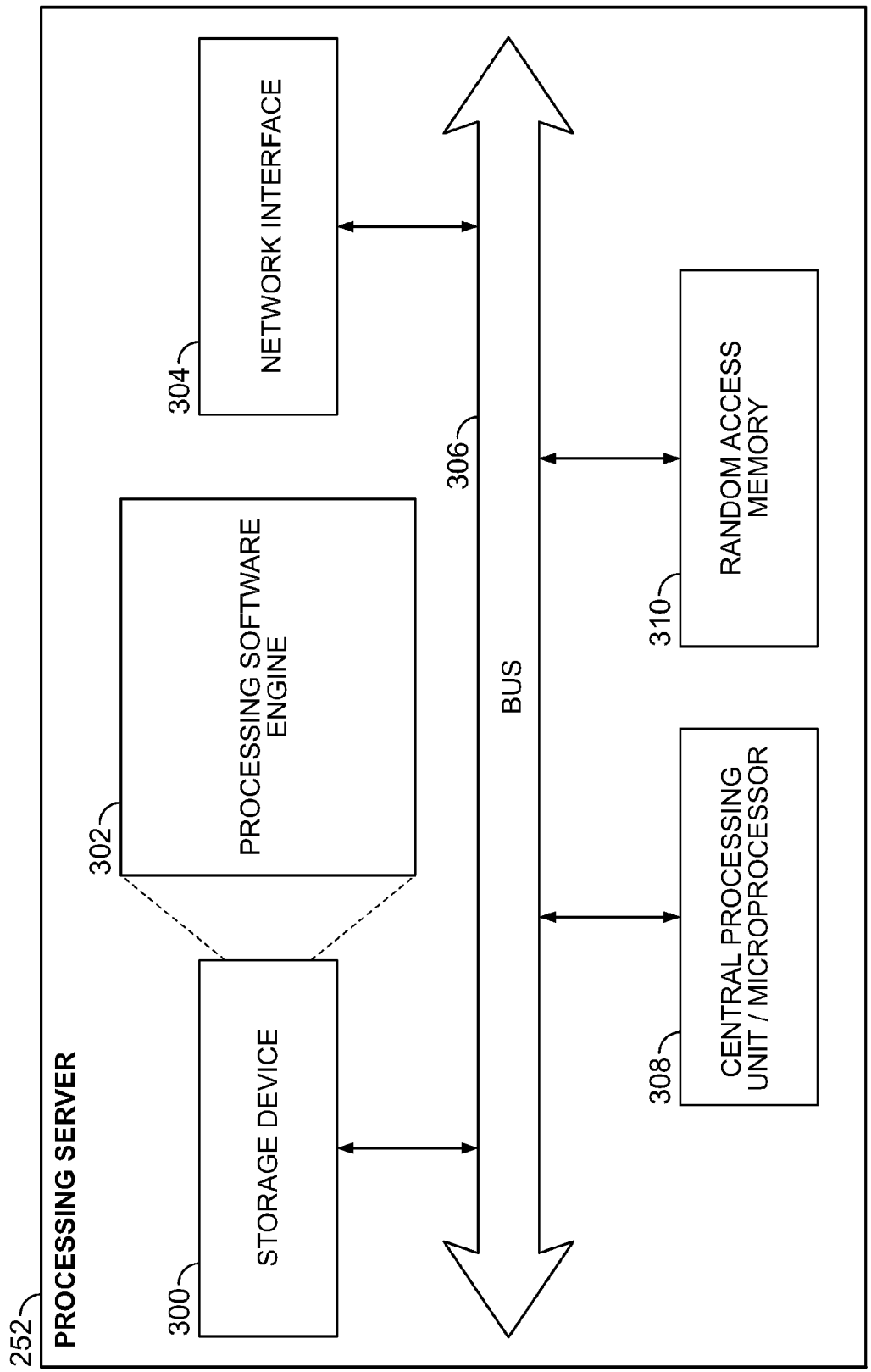
FIG. 8 is a diagram showing sample components of a processing server (depicted in FIG. 7) in greater detail.

FIG. 8 is a diagram showing components of the processing provider 252 depicted in FIG. 7, in greater detail. The server 252 could include a storage device 300, a network interface 304, a communications bus 306, a central processing unit (e.g., incorporating a single or multiple-core microprocessor) 308, a random access memory (RAM) 310, etc. The storage device 300 could comprise any suitable computer-readable storage medium such as disk, non-volatile memory (e.g., EPROM, EEPROM, a flash memory, etc.). Much of the functionality provided by the present invention could be provided by a processing software engine 302, which could be embodied as computer-readable program code stored on the storage device 300 and executed by the CPU 308 using any suitable, high or low level computing language, such as Java, C, C++, C#, .NET, etc. The network interface 304 could include an Ethernet network interface device, a wireless network interface device, or any other suitable device which permits the system provider computer system 250 to communicate via a network 268.

As is commonly done, a system provider that also provides banking services or a bank that provides services in conjunction with the system can provide a credit line to qualifying persons or entities (e.g., purchasers), allowing embodiments of the present invention to be implemented as a pre-paid credit system and/or as a financed credit system (i.e., embodiments of the present invention can be utilized in connection with pre-paid credit and/or financed credit). Within a pre-paid system, the date credit is purchased, would be the date the purchaser's credit line is drawn upon.

Alternatively, within a financed credit system, the date credit is redeemed, would be the date a credit line is drawn upon. In this embodiment, the system could be implemented where, for example, the payment/redemption rate provided by a redeemer on a given day, would apply to the very same day, and such a rate, in combination with the system providers pre-programmed parameters could be displayed by redeemers and publicized to authorized presenters as a daily "cost/redemption rate". Also in this embodiment, there would be no need for a presenter to pre-submit offers (or the acceptance of such), as terms associated with the credit are established.

A platform can be provided to a purchaser where options to borrow against such credit lines can be chosen. For the purpose of keeping the examples provided within the diagrams and specification less complicated, the business credit referenced within the examples is prepaid. It is of note that redeemers are currently paid for store credit prior to the redemption of the same.

The present invention could also be implemented in the form of an auction, where business credit is sold to the highest bidder. Here, a system provider can provide a platform where offers (or bids) can be submitted for established business credit. These auctions could include reserves (minimum selling prices) from the selling party (e.g., a vendor). Time limits could dictate the closing of the bidding process and could be communicated to parties. Data (e.g., the monetary amount bid) associated with this embodiment could be communicated as previously described (using communication links via a network).

Alternatively, the present invention could be implemented as systems or methods that enable negotiation between parties. Here, a platform could be provided where parties could communicate offers to buy or sell business credit (established or proposed), or request offers to buy or sell the same. Such offers could be accepted or rejected, or a means to communicate counteroffers could be provided. In brief, the present invention could be implemented as systems and methods for negotiating terms relating to business credit, as well as systems and methods to propose and/or accept offers for the same.

The present invention includes methods and systems where multiple terms associated with business credit could be proposed, and offers to buy (or sell) the same could be provided by various parties (e.g., purchasers, presenters, system providers, vendors, etc.). The present invention includes methods and systems where offers associated with business credit (established or proposed) could be communicated from party to party. The present invention includes methods and systems where purchasers could propose both the redemption value of business credit, as well as the price they are willing to pay for it.

The present invention includes systems and methods where business credit can be created, established, and/or initially issued by parties other than redeemers affiliated with the same. The present invention includes systems and methods where business credit can be electronically transferred from one party to another. The present invention includes systems and methods that can enhance features and benefits associated with store credit and may alleviate restrictions currently associated with store credit. The present invention includes systems and methods where multiple terms associated with business credit can be proposed by parties other than redeemers. The present invention includes systems and methods that can affiliate credit with particular redeemers within a credit system (incorporating multiple redeemers). The present invention includes systems and methods that can exclude particular redeemers within a credit system from redeeming credit that may be redeemable with other redeemers utilizing the same credit system.

The present invention also provides a means where funds used to purchase business credit (including expired business credit) can be disbursed to various and/or multiple parties (e.g., refunded to a purchaser). Furthermore, the present invention includes a secondary market, wherein authorized presenters (e.g., a gift recipient) of business credit are provided with a platform to electronically transfer (e.g., gift or sell) the same.

The present invention can also be licensed. A licensee can be granted the right to implement all or some of the embodiments of the present invention. The functionality provided by the present invention could be provided wherein a licensee is, or is not the system provider. Thus, it could appear (e.g., to a purchaser) that the functionality provided by a party (e.g., a licensor), is provided by a different party (e.g., a licensee). Licensing fees could be paid to a licensor for rights relating to intellectual property, software, hardware, etc. Various embodiments of the present invention can be licensed to one system provider, or licensed to multiple system providers. Furthermore, for example, a single system provider could provide systems and methods relating to one aspect of the present invention (e.g., an exchange for the buying and selling of business credit) while other aspects of the invention (e.g., payment processing and/or the accounting and/or organizing of business credit) are licensed (e.g., to marketing companies, multiple banks or a credit card company, etc.), as would be understood by someone skilled in the art.

Having thus described the present invention in detail, it is to be understood that the foregoing description is not intended to limit the spirit or scope thereof. Many of the embodiments of the present invention described herein are merely exemplary, and a person skilled in the art may make many variations and modifications without departing from the spirit and scope of the invention. All such variations and modifications are intended to be included within the scope of the invention.

What is claimed is:

1. A method of providing electronic payment services comprising the following steps:
    establishing a payment acceptance agreement with a redeemer;
    storing information in a database identifying the redeemer;
    providing an interface to a purchaser over an electronic network for communication between a system provider and the purchaser regarding the establishment of multiple terms of use in connection with a potential business credit;
    providing an interface to a purchaser over an electronic network for communication between the system provider and the purchaser regarding an offer to purchase or sell the potential business credit;
    providing an interface to a purchaser over an electronic network for communication between the system provider and the purchaser regarding acceptance of the offer to purchase or sell the potential business credit;
    storing information in a database identifying a presenter;
    providing the presenter with a redemption apparatus for storing and transmitting transaction data that includes information identifying the presenter in connection with an attempted payment transaction;
    providing the business credit or access to the business credit to the presenter via an electronic network;
    presentation of the redemption apparatus by the presenter to a redeemer of the payment network in connection with one or more transactions between the presenter and redeemer;
    receiving an authorization request and transaction data over an electronic network from the redeemer, including data identifying the presenter and redeemer;
    determining applicability of the business credit to the transaction based on the transaction data identifying the presenter and redeemer; and
    transmitting a notice of approval or declination over an electronic network in response to the authorization request.

2. The method of claim 1 further comprising the following steps in connection with approvals:
    processing the business credit in accordance with the multiple terms of use; and
    facilitating payment to the redeemer in accordance with the payment acceptance agreement.

3. The method of claim 1 wherein the terms of use include the designation of particular redeemers or a particular redeemer within the payment network with which the business credit can be used, to the exclusion of other redeemers within the payment network.

4. The method of claim 1 wherein the terms of use include the designation of a particular product or particular products with which the business credit can be used, to the exclusion of any other products.

5. The method of claim 1 wherein the terms of use include the designation of a particular brand with which the business credit can be used, to the exclusion of any other brand.

6. The method of claim 1 wherein each business credit can be sold for a monetary amount that is less than its initial redemption value.

7. The method of claim 1 wherein the purchaser and the presenter are one in the same.

8. A method of providing electronic payment services within a payment network that includes a plurality of unaffiliated redeemers comprising:
    storing information identifying each individual redeemer of the payment network;
    storing information identifying each individual purchaser and presenter of the payment network;
    providing an interface over an electronic network for the transfer of funds to a system provider;
    providing a presenter with a business credit account
    providing the presenter with one or more business credits that can each be redeemed at one or more unaffiliated redeemers within the payment network, to the exclusion of other redeemers within the payment network;
    providing the presenter with access to a credit line, debit account, general purpose prepaid account or business credit account via an electronic network;
    providing the presenter with a redemption apparatus that can be used to access a credit line, debit account, general purpose prepaid account or business credit account via an electronic network in connection with payment transactions with redeemers;
    presentation of the redemption apparatus by the presenter to a redeemer;
    receiving an authorization request and transaction data from the redeemer over an electronic network, including data identifying the redeemer and the presenter;
    processing the data to determine if a credit line, debit account, general purpose prepaid account or business credit account credit of the presenter should apply to the transaction;
    processing the data to determine the amounts from each applicable account; and
    transmitting an approval or declination response to the redeemer over an electronic network in connection with the authorization request.

9. The method of claim 8 wherein upon transmitting a notice of approval, the following steps are also conducted:
    facilitating payment to the redeemer; and
    the applicable accounts are updated.

10. The method of claim 8 wherein the redemption apparatus is a payment card.

\* \* \* \* \*